US009602304B2

(12) United States Patent
Mochida et al.

(10) Patent No.: US 9,602,304 B2
(45) Date of Patent: Mar. 21, 2017

(54) DATA TRANSFER DEVICE SYSTEM, NETWORK SYSTEM, AND METHOD OF CHANGING CONFIGURATION OF NETWORK SYSTEM

(71) Applicant: ALAXALA Networks Corporation, Kawasaki-shi, Kanagawa (JP)

(72) Inventors: Shigeo Mochida, Kawasaki (JP); Yoshihisa Tanaka, Kawasaki (JP)

(73) Assignee: ALAXALA NETWORKS CORPORATION, Kanagawa (JP)

( * ) Notice: Subject to any disclaimer, the term of this patent is extended or adjusted under 35 U.S.C. 154(b) by 102 days.

(21) Appl. No.: 14/592,488

(22) Filed: Jan. 8, 2015

(65) Prior Publication Data
US 2015/0195102 A1   Jul. 9, 2015

(30) Foreign Application Priority Data

Jan. 9, 2014   (JP) ................................. 2014-002571

(51) Int. Cl.
*H04L 12/28*   (2006.01)
*H04L 12/437*   (2006.01)
(Continued)

(52) U.S. Cl.
CPC .......... *H04L 12/437* (2013.01); *H04L 12/427* (2013.01); *H04L 41/0668* (2013.01);
(Continued)

(58) Field of Classification Search
CPC combination set(s) only.
See application file for complete search history.

(56) References Cited

U.S. PATENT DOCUMENTS 6,766,482 B1 *   7/2004   Yip ..................... H04L 12/437
                                                          370/216
7,876,673 B2 *   1/2011   Ram ..................... H04L 12/42
                                                          370/222
(Continued)

FOREIGN PATENT DOCUMENTS

JP   2005-130049 A   5/2005
JP   2008-136013 A   6/2008
(Continued)

OTHER PUBLICATIONS

Alaxala Networks Corporation, AX Series ALAXALA Ring Configuration Guide for the Guaranteed Network, Edition 1, 75 pages, 2008.*
(Continued)

*Primary Examiner* — Frank Duong
(74) *Attorney, Agent, or Firm* — Volpe and Koenig, P.C.

(57) ABSTRACT

To improve fault tolerance of a ring network, provided is a data transfer device system belonging to a ring network system. The data transfer device system includes a plurality of data transfer devices; the plurality of data transfer devices including a first data transfer device and a second data transfer device connected with the first data transfer device; the first data transfer device having a first ring port; and the second data transfer device having a second ring port. The first data transfer device controls whether to permit the first ring port and the second ring port to transfer data based on a state of the network system, an attribute of the first data transfer device in the data transfer device system, and an attribute of the data transfer device system in the network system.

14 Claims, 16 Drawing Sheets

(51) Int. Cl.
    *H04L 12/427*     (2006.01)
    *H04L 12/24*     (2006.01)
    *H04L 12/933*     (2013.01)
    *H04L 12/939*     (2013.01)
    *H04L 12/703*     (2013.01)

(52) U.S. Cl.
    CPC .......... *H04L 49/102* (2013.01); *H04L 49/557* (2013.01); *H04L 45/28* (2013.01)

(56) References Cited

U.S. PATENT DOCUMENTS

| | | |
|---|---|---|
| 2008/0126536 A1 | 5/2008 | Sakurai |
| 2008/0275975 A1* | 11/2008 | Pandey .................. H04L 49/70 709/223 |
| 2009/0219808 A1* | 9/2009 | Ogura .................. H04L 12/423 370/223 |
| 2012/0155254 A1 | 6/2012 | Hinosugi |
| 2013/0170359 A1 | 7/2013 | Ino et al. |

FOREIGN PATENT DOCUMENTS

| | | |
|---|---|---|
| JP | 2013-051481 A | 3/2013 |
| JP | 2013-098839 A | 5/2013 |
| JP | 2013-102546 A | 5/2013 |

OTHER PUBLICATIONS

Japanese Office Action issued on Dec. 6, 2016 in the Japanese Application No. 2014-002571. Concise Explanation is attached herewith.

* cited by examiner

CONFIGURATION TABLE

| SWITCH | STACK PRIORITY | STACK PORT NUMBER | RING ID | RING MODE | RING PORT NUMBER | PORT SHUTDOWN SETTING |
|---|---|---|---|---|---|---|
| SWITCH 1 | 20 | 1/0/1 | 2 | MASTER | 1/0/40 | NO SHUTDOWN |
| SWITCH 2 | 10 | 2/0/5 | 2 | MASTER | 2/0/35 | NO SHUTDOWN |

*Fig. 3*

STACK STATE MANAGEMENT TABLE

| SWITCH | STACK STATE |
|---|---|
| SWITCH 1 | MASTER |
| SWITCH 2 | BACKUP |

*Fig. 4*

PORT LINK STATE MANAGEMENT TABLE

| SWITCH | PORT NUMBER | PORT STATE |
|---|---|---|
| SWITCH 1 | 1/0/1 | UP |
| ⋮ | ⋮ | ⋮ |
| SWITCH 1 | 1/0/40 | UP |
| ⋮ | ⋮ | ⋮ |
| SWITCH 2 | 2/0/5 | UP |
| ⋮ | ⋮ | ⋮ |
| SWITCH 2 | 2/0/35 | UP |
| ⋮ | ⋮ | ⋮ |

*Fig. 5*

RING PORT STATE MANAGEMENT TABLE

| SWITCH | RING ID | RING PORT NUMBER | RING PORT | RING PORT STATE | RING FAILURE STATE |
|---|---|---|---|---|---|
| SWITCH 1 | 2 | 1/0/40 | PRIMARY | FORWARDING | NORMAL |
| SWITCH 2 | 2 | 2/0/35 | SECONDARY | BLOCKING | NORMAL |

*Fig. 6*

DATA TRANSFER DEVICE SYSTEM, NETWORK SYSTEM, AND METHOD OF CHANGING CONFIGURATION OF NETWORK SYSTEM

CLAIM OF PRIORITY

The present application claims priority from Japanese patent application JP2014-2571 filed on Jan. 9, 2014, the content of which is hereby incorporated by reference into this application.

BACKGROUND OF THE INVENTION

This invention relates to a data transfer device system and a network system including the data transfer device system.

The technical field of this invention includes background techniques such as JP 2008-136013 A (Patent Literature 1), JP 2013-102546 A (Patent Literature 2), and JP 2013-51481 A (Patent Literature 3).

Patent Literature 1 states: As apparatuses which construct a ring network, a structure including a monitoring apparatus and other relay apparatuses is employed. The monitoring apparatus monitors only a ring status of such a ring network to which the own monitoring apparatus belongs. The monitoring apparatus periodically transmits health check frames from ring ports thereof respectively so as to monitor whether or not the transmitted health check frame has been received by the ring port located opposite thereto. Also, in a structure of a multi-ring network having a shared link, auxiliary health check frames are periodically transmitted from two sets of shared apparatuses respectively with respect to a monitoring apparatus of a shared link non-monitored ring network. The monitoring apparatus also monitors the auxiliary health check frames in combination with the health check frames in order to avoid an occurrence of a loop which bridges a plurality of ring networks.

Patent Literature 2 states: In packet relay devices which can be virtually seen as a single unit by linking the plurality of devices, the flow of communication or communication volume is automatically determined by having a link optimization adjustment or a packet analysis part and traffic flowing in a control part is controlled to compensate the band shortage by optimizing lines to be mainly driven.

Patent Literature 3 states: In a ring network including an old master node, a new master node is used as a replacement for the old master node. During replacement operation, when detecting that two ring ports of the new master node are set in link-up state, the new master node gives a transit node an instruction to forward a health check frame sent from a ring port of the old master node by a forwarding route going through the new master node. The new master node can monitor the status of the ring network by receiving the health check frame.

SUMMARY OF THE INVENTION

In the ring network disclosed in Patent Literature 1 or 3, a ring is formed by annularly connecting a plurality of relay apparatuses. One of the relay apparatuses forming a ring is a relay apparatus having a monitoring function (referred to as "monitoring apparatus" in Patent Literature 1 and "master node" in Patent Literature 3) and the remaining are relay apparatuses having no monitoring function (referred to as simply "relay apparatuses" in Patent Literature 1 and "transit nodes" in Patent Literature 3). The monitoring apparatus monitors the condition of the ring for any failure by sending health check frames from two ring ports connected to the ring and changes the states of the ring ports upon detection of a failure. As a result, the communication path for the data transmitted in the ring is switched to a path which does not include the failed part. However, when a failure occurs in the monitoring apparatus, the failure monitoring function for the ring using health check frames is stopped and switching the path becomes unavailable.

Patent Literature 2 discloses a technique of apparatus stacking to improve the fault tolerance of the relay apparatus by virtually treating a plurality of physical relay apparatuses as a single relay apparatus. The inventors have found that the fault tolerance of a ring network is improved by applying this technique to the ring network disclosed in Patent Literature 1 or 3.

However, when two physical relay apparatuses are used as one virtual monitoring apparatus for a ring network to apply the apparatus stacking technique according to Patent Literature 2 to the ring network disclosed in Patent Literature 1 or 3, two ring ports of the single virtual monitoring apparatus are provided separately in two physical relay nodes. Accordingly, an existing control method for a ring network based on an assumption of monitoring by a single relay apparatus cannot control the ring ports separately provided in two relay apparatus.

Furthermore, according to the control method for the apparatus stacking disclosed in Patent Literature 2, one of the plurality of physical relay apparatuses controls the operations of the other relay apparatuses to virtually work as a single relay apparatus and to achieve redundancy; for this reason, these other relay apparatuses forming the single virtual relay apparatus can be monitored but relay apparatuses other than the other relay apparatuses forming the single virtual relay apparatus cannot be monitored.

In view of the above, this invention aims to improve the redundancy of one node included in a ring network, to prevent generation of a loop in the ring network, and to ensure the continuity of communications through failure monitoring on the ring.

In order to solve at least one of the foregoing problems, there is provided a data transfer device system belonging to a ring network system, the data transfer device system comprising a plurality of data transfer devices, the plurality of data transfer devices including a first data transfer device and a second data transfer device connected with the first data transfer device, the first data transfer device having a first port connected with a third data transfer device which belongs to the network system and does not be included in the data transfer device system, and the second data transfer device having a second port connected with a fourth data transfer device which belongs to the network system and does not be included in the data transfer device system, wherein the first data transfer device controls whether to permit the first port and the second port to transfer data based on a state of the network system, an attribute of the first data transfer device in the data transfer device system, and an attribute of the data transfer device system in the network system.

An aspect of this invention may improve the fault tolerance of a ring network.

The problems, configurations, and effects other than those described above are clarified by the following description of the embodiments.

BRIEF DESCRIPTION OF THE DRAWINGS

FIG. 3 is an illustrative view of a configuration table held by a switch in Embodiment 1 of this invention.

FIG. 4 is an illustrative view of a stack state management table held by the switch in Embodiment 1 of this invention.

FIG. 5 is an illustrative view of a port link state management table held by the switch in Embodiment 1 of this invention.

FIG. 6 is an illustrative view of a ring port state management table held by the switch in Embodiment 1 of this invention.

DETAILED DESCRIPTION OF THE EMBODIMENTS

Hereinafter, embodiments of this invention are described with reference to the drawings.
Embodiment 1
FIG. 1 is a block diagram illustrating a configuration of a network system in Embodiment 1 of this invention.

Figure 1:
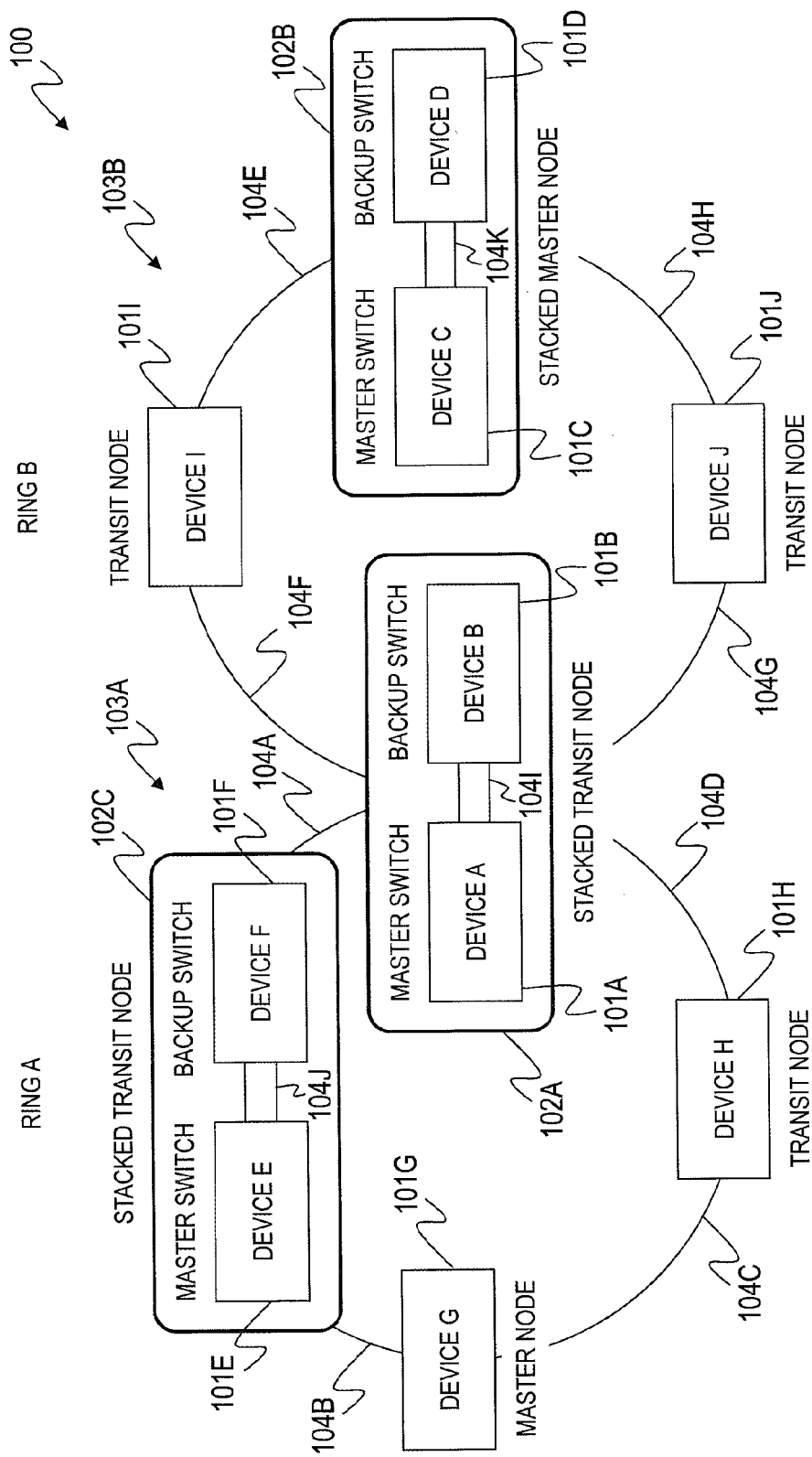
FIG. 1 is a block diagram illustrating a configuration of a network system in Embodiment 1 of this invention.

The network system 100 illustrated in FIG. 1 is an example of a network system to which this embodiment is applied and it is composed of data transfer devices 101A to 101J. Each of the data transfer devices 101A to 101J may be of any type, but, in an example, of a type that transfers received data based on the data of the Layer 2 (the data link layer) of the OSI reference model. In the following description, the data transfer devices 101A to 101J are also referred to as switches 101A to 101J. When the switches 101A to 101J do not need to be distinguished from one another, for example, in providing description common to all of the switches 101A to 101J, they are also referred to as switch 101. The same applies to the other switches to be described later. With regard to the other components, reference signs with omission of A, B, C, or the like may be used in providing description common to the same kind of components.

The network system 100 employs a ring protocol. The ring protocol is a redundancy protocol for a network annularly connecting a plurality of nodes to rapidly detect a failure and to rapidly switch paths upon detection of the failure (Patent Literature 1). Each node may be a single switch 101 or a plurality of switches 101 forming a later-described stack. In the example of FIG. 1, each of the switches 101G, 101H, 101I, and the 101J is configured as a node. Hereinafter, the node configured with the switch 101G, 101H, 101I, or 101J may be referred to as node 101G, 101H, 101I, or 101J, respectively. In the meanwhile, the switch 101A and 101B are configured as a single node 102A; the switch 101C and 101D are configured as a single node 102B; and the switch 101E and 101F are configured as a single node 102C.

Stacking provides functionality for virtually operating a plurality of physically interconnected switches 101 as a single switch, enabling communications to be kept available even when a part of the plurality of switches are failed (Patent Literature 2). Hereinafter, a node configured with a single virtual switch provided by the stack functionality (for example, one of the nodes 102A to 102C in FIG. 1) may be referred to as stacked node. A group of a plurality of switches 101 constituting a virtual switch (for example, the group of the switches 101A and 101B in FIG. 1) may be referred to as a stack, each of the switches included in a stack (for example, each of the switch 101A and 101B in FIG. 1) as a switch configured for a stack or a member switch of a stack.

In the example of FIG. 1, the node 102A is connected with the node 102C by a link 104A, the node 102C is connected with the node 101G by a link 104B, the node 101G is connected with the node 101H by a link 104C, the node 101H is connected with the node 102A by a link 104D to form a ring 103A. Furthermore, the node 102A is connected with the node 101J by a link 104G, the node 101J is connected with the node 102B by a link 104H, the node 102B is connected with the node 101I by a link 104E, the node 101I is connected with the node 102A by a link 104F to form another ring 103B. One of the nodes forming a ring is a master node and the others are transit nodes. The detailed definitions of these will be described later. In the example of FIG. 1, the node 101G is the master node of the ring 103A; the node 102B is the master node of the ring 103B; and the other nodes are transit nodes of the rings.

In the two switches 101 working as a virtual switch by the stack functionality, one is a master switch and the other is a backup switch. The detailed definitions of these will also be described later. In the example of FIG. 1, the switches 101A, 101C, and 101E are master switches and the switches 101B, 101D, and 101F are backup switches. This embodiment provides an example in which two switches 101 form a stack by way of representative example; however, this invention is applicable to a case in which three or more switches 101 form a stack. In that case, one of the three or more member switches is a master switch and another one of them is a backup switch.

To connect the stacked node 102B with the nodes 101I and 101J as described above, one of the switches 101C or 101D in the node 102B is physically connected with the switch 101I by the link 104E, the other is connected with the switch 101J by the link 104H, and the switches 101C and 101D are connected by the link 104K to form a part of the ring 103B. The same applies to the other stacked nodes 102A and 102C. A link connecting two switches forming a stack, such as the link 104I connecting the switches 101A and 101B, the link 104J connecting the switches 101E and 101F, or the foregoing link 104K, is also referred to as stack link.

Although omitted from FIG. 1, in actual cases, one or more further network devices may be connected with each node shown in FIG. 1. For example, one of the nodes shown in FIG. 1 may be connected with a node (not shown) belonging to a different ring to belong to the different ring as well. Alternatively, one of the nodes shown in FIG. 1 may be connected with a network device (such as a data transfer device or a server) which does not belong to any ring. Those network devices may be a source or a destination of data transmitted through the rings shown in FIG. 1.

Figure 2A:
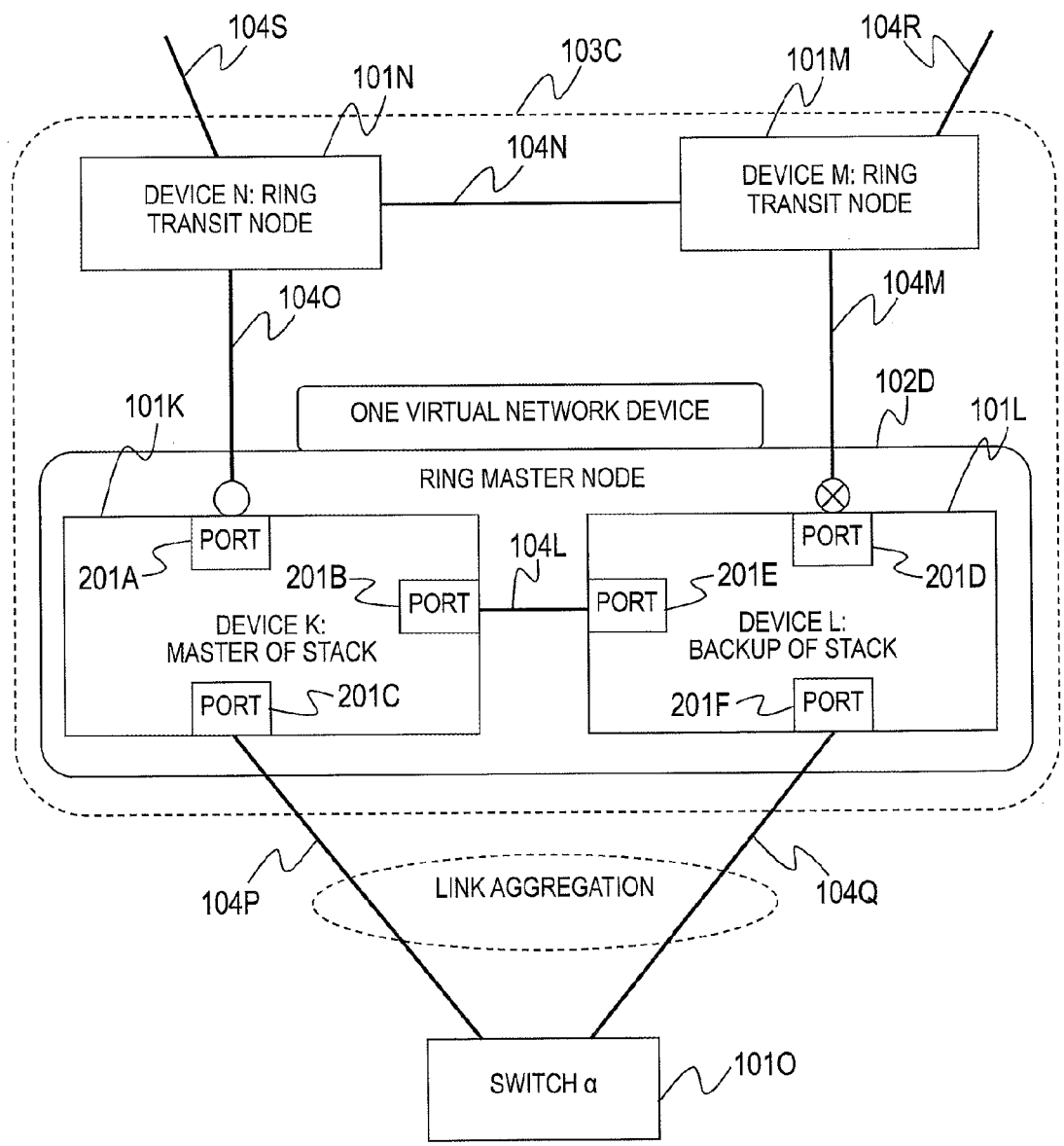
FIG. 2A is a block diagram illustrating connections among switches in the network system in Embodiment 1 of this invention.

FIG. 2A is a block diagram illustrating connections among switches 101 in the network system in Embodiment 1 of this invention.

Although this embodiment is applicable to various topologies of ring networks as illustrated in FIG. 1, FIG. 2A illustrates a ring 103C composed of switches 101K to 101N for simplicity of explanation. In this example, the switches 101K and 101L are connected by a link 104L to form a stacked master node 102D. The switches 101M and 101N are transit nodes. Hereinafter, the switches 101M and 101N may be referred to as nodes 101M and 101N, respectively.

Each switch 101 has a plurality of ports. FIG. 2A shows only ports 201A to 201C of the switch 101K and ports 201D to 201F of the switch 101L by way of example and omits the remaining ports. The ports connecting nodes forming a ring is also referred to as ring ports. In FIG. 2A, the ports 201A and 201D are ring ports. Each of the switches 101M and 101N also has two ring ports (not shown). The port 201A is connected with one of the ring ports of the switch 101N by the link 104O and the port 201D is connected with one of the ring ports of the switch 101M by the link 104M. The other ring ports of the switch 101M is connected with the other ring port of the switch 101N by the link 104N.

As described above, a node belonging to a ring has two ring ports; in a master node, one of the ring ports is treated as a primary port and the other is treated as a secondary port. When no failure occurs in the ring, the master node logically blocks the secondary port so as not to send or receive a data frame. In the example of FIG. 2A, the port 201A is a primary port and the port 201D is a secondary port; accordingly, when no failure exists, the port 201D is blocked. This will be described later in detail.

The port 201B of the switch 101K is connected with the port 201E of the switch 101L by the link 104L. These ports connecting two switches forming a stack (i.e., the ports connected to a stack link) are also referred as stack ports.

Physically, for example, each link 104 may be made of a network cable connecting two ports 201.

Each switch 101 forming a ring 103C may further be connected to one or more network devices through ports other than the foregoing ring ports (ring ports other than the foregoing ring ports or ports different from ring ports). In the example of FIG. 2A, the ports 201C and 201F are connected with a switch 101O which does not belong to the ring 103C by links 104P and 104Q, respectively. In this example, the links 104P and 104Q are virtually treated as a single link with so-called link aggregation. As a result, when a failure occurs in either one of the switches 101K and 101L, the node 102D keeps communications with the switch 101O using the other normally working one. It should be noted, however, the application of the link aggregation is merely an example; the links 104P and 104Q may separately connect to different switches (not shown). In similar, the switches 101M and 101N may be connected with not-shown given network devices by the link 104R and 104S, respectively.

Figure 2B:
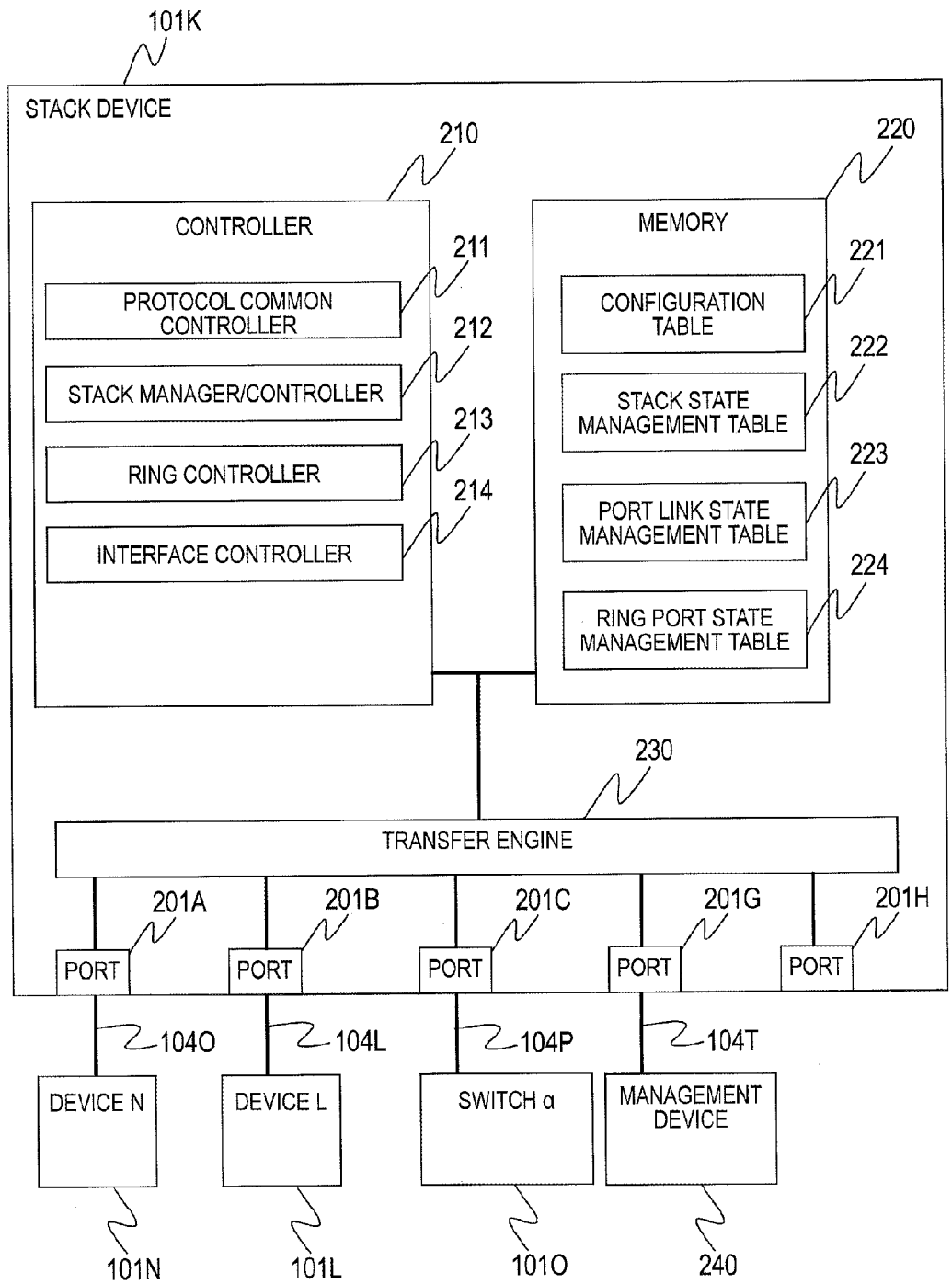
FIG. 2B is a block diagram illustrating a configuration of a switch included in the network system in Embodiment 1 of this invention.

FIG. 2B is a block diagram illustrating a configuration of a switch 101 included in the network system in Embodiment 1 of this invention.

FIG. 2B illustrates a configuration of the switch 101K belonging to the ring 103C and configured for a stack by way of example. Although the configurations of the other switches 101 are basically the same as FIG. 2B, information held by the switches may be different depending on the attributes of the switch 101 (for example, whether the switch 101 belongs to a ring or whether the switch 101 is configured for a stack). A management device 240 used by the user to input a command is connected with the switch 101K through the link 104T via a port 201G. The connection port for the management device 240 may be any one of the ports 201. The management device may be provided outside of the switch 101K as shown in FIG. 2B or the switch 101K may internally have the functions of the management device.

The switch 101K includes a controller 210, a memory 220, and a transfer engine 230, which are interconnected with one another, and a plurality of ports 201 connected with the transfer engine 230. The controller 210 includes a protocol common controller 211, a stack manager/controller 212, a ring controller 213, and an interface controller 214. These may be implemented with dedicated hardware. Alternatively, the controller 210 may be a processor, which executes programs stored in the memory 220 to implement the controllers such as the protocol common controller 211. In that case, the processing performed by the controllers such as the protocol common controller 211 is actually performed by the processor corresponding to the controller 210.

The memory 220 stores a configuration table 221, a stack state management table 222, a port link state management table 223, and a ring port state management table 224. The configuration table 211 stores information on switches forming a ring network, including information indicating an attribute of the node including the switch in the network system forming a ring network (master node or transit node). The stack state management table 222 includes information indicating an attribute in the stacked data transfer device system configured as a stack (master or backup). The port link state management table 223 holds information about the states of the ports of the switches forming a stack. The ring port state management table 224 includes information on the two ring ports of the switch including the table.

The controller 210 updates the configuration table 221 in accordance with input of commands from the external to configure the switches with respect to the ring protocol and the stack.

The controller 210 (interface controller 214) detects a state change in the ports of the switch and updates the port link state management table 223.

The controller 210 (protocol common controller 211) controls transmission of health check frames in the ring based on the attribute of the node including the switch in the ring network system (master node or transit node). It also controls transmission of health check frames in the stack based on the attribute in the data transfer device system configured as a stack (master or backup).

The controller 210 (stack manager/controller 212) monitors the conditions of the switches forming a stack and upon detection of a failure in a switch, switches the attribute in the data transfer device system configured as a stack (master or backup) based on the stack state management table 222.

The controller 210 (ring controller 213) updates the ring port state management table 224 based on the configuration table 221 and the stack state management table 222. It also monitors the condition of the ring network system (whether the ring network system is in a normal state where no failure occurs or a failed state where a failure occurs therein) and updates the ring port state management table 224 based on the monitoring result to control the configuration of the ring ports in the switches forming a stack.

The transfer engine 230 transfers data received at one of the ports 201 via the link 104 to a different port 201. The different port 201 sends out the transferred data using the link 104 connected from the port 201. Through these operations, the data transfer function of the switch 101K is implemented. For example, if the switch 101K is a Layer 2 switch, the switch 101K holds a not-shown Media Access Control (MAC) address table and the transfer engine 230 checks the destination MAC address included in the header of the received frame with the MAC address table to transfer the frame to the identified port 201. The transfer engine 230 further changes the state of the port 201 in accordance with an instruction from the controller 210.

Next, the tables held by the switch 101 are described with reference to FIGS. 3 to 6. In this section, the tables held by the switch 101K shown in FIGS. 2A and 2B are described by way of example.

FIG. 3 is an illustrative view of a configuration table 221 held by the switch 101K in Embodiment 1 of this invention.

The configuration table 221 holds configuration information for switches 101. The configuration information held in this table is configured in accordance with commands input by the user. The stored configuration information is kept until the user inputs another command for a change. The user inputs a command to the management device 240 connected with one of the ports of the switch 101; the management device 240 provides the information input by the command to the configuration table 221. The management device 240 may be connected with the switch 101 to input a command and disconnected from the switch 101 after completion of inputting. In addition, for the switches 101K and 101L to have the identical configuration tables 221, synchronization may be performed using later-described stack health check frames. Alternatively, the user may separately input commands to the switches 101K and 101L so that the configuration information will be identical between the configuration tables 221 held by the switches 101K and 101L.

The configuration table 221 shown in FIG. 3 includes records corresponding to the switches 101K and 101L forming a stack and each record includes a switch 301, a stack priority 302, a stack port number 303, a ring ID 304, a ring mode 305, a ring port number 306, and a port shutdown setting 307.

The switch 301 is identification information of the switch 101. In the example of FIG. 3, SWITCH 1 identifies the switch 101K and SWITCH 2 identifies the switch 101L.

The stack priority 302 indicates a priority level in the stack of the switch 101. In an example, as the value of the stack priority 302 is greater, the priority level is higher. This value is referenced to determine which one of the two switches to be the master switch at the start of stack operation. For example, the switch 101K indicating the higher priority level in the stack priority 302 is first determined to be the master switch.

The stack port number 303 is identification information on the stack port connected with the stack link. In the example of FIG. 3, "1/0/1" identifies the port 201B, "2/0/5" identifies the port 201E. In this example, the first "2" in the "2/0/5" represents the number of the switch 101L including this port 201E, "0" represents a slot number, and "5" represents the number of the port 201E in the switch 101L; however, such a format of the identification information is an example and any format may be employed in actual cases. Although the switches 101K and 101L in FIG. 3 each have one stack port, they may have a plurality of stack ports to be connected with each other using a plurality of stack links in actual cases.

The ring ID 304 is identification information on the ring 103C the switches 101K and 101L belong to. In the example of FIG. 3, the ring ID 304 of the ring 103C is "2". In the case where the network system 100 has a plurality of rings 103 as shown in FIG. 1, each ring 103 is provided with unique identification information.

The ring mode 305 indicates the attribute of the node the switch belongs to in the ring network. Specifically, the ring mode 305 indicates whether the node including the switches 101K and 101L is a master node or a transit node. In the example of FIG. 3, the ring mode 305 is MASTER because the node 102D is a master node.

As will be described later in detail, if the ring mode 305 is MASTER, the node including the switches 101K and 101L forming a stack serves as a master node of the ring network: it sends ring health check frames from each of the two ring ports to the adjacent nodes in the ring network, and receives and terminates health check frames from the adjacent nodes in the ring network to monitor the ring network for any failure. In contrast, if the ring mode 305 is TRANSIT, the node including the switches 101K and 101L forming a stack serves as a transit node of the ring network: upon receipt of a health check frame from an adjacent node at one of the ring ports, the node sends the health check frame from the other ring port to the other adjacent node of the ring network to transfer it.

The ring port number 306 is identification information on the ring port connected with an adjacent node. In the example of FIG. 3, "1/0/40" identifies the port 201A and "2/0/35" identifies the port 201D. The port shutdown setting 307 indicates whether the ring port is shut down. A value SHUTDOWN in the port shutdown setting 307 indicates that the ring port is shut down; a value NO SHUTDOWN indicates that ring port is not shut down. In the example of FIG. 3, neither of the ring ports is shut down.

Hereinafter, examples of commands to set a value to the configuration table 221 are provided so as to accord with FIGS. 2A and 3. To configure the ring mode 305 in the ring 103C of the switch 101K or 101L as master mode, the following commands are used:

(config)# ring 2
(config-ring)# mode master

To configure the port 201A of the switch 101K and the port 201D of the switch 101L as ring ports, the following commands are used:

(config) # interface 1/0/40
(config-if)# ring-port 2
(config-if)# exit (config) # interface 2/0/35
(config-if)# ring-port 2

To configure the ring mode 305 in the ring 103C of the switch 101M or 101N as transit mode, the following commands are used:

(config)# ring 2
(config-ring)# mode transit

To configure the stack priority of the switch 101K at "20", the following command is used:

(config)# switch 1 priority 20

To configure the port 201B of the switch 101K as a stack port, the following commands are used:

(config)# interface 1/0/1
(config-if)# switchport mode stack
(config-if)# exit

To shut down the port 201A of the switch 101K, the following commands are used:

(config)# interface 1/0/40
(config-if)# shutdown

To cancel the shutdown of the port 201A of the switch 101K, the following commands are used:

(config)# interface 1/0/40
(config-if)# no shutdown

FIG. 4 is an illustrative view of a stack state management table 222 held by the switch 101K in Embodiment 1 of this invention.

The stack state management table 222 is a table held by a switch 101 configured for a stack to manage stack states.

The stack state management table 222 shown in FIG. 4 includes records corresponding to the switches 101K and 101L forming a stack; each record includes a switch 401 and a stack state 402. The switch 401 is, like the switch 301 in FIG. 3, identification information on the switch 101 configured for a stack. The stack state 402 indicates the attribute of the switch in the stack. Specifically, the stack state 402 indicates which state of the stack the switch 101 is in, a master state, a backup state, or an initial state. The example of FIG. 3 indicates that the switch 101K is a master switch and the switch 101L is a backup switch. When the switch 101 is not determined to be a master switch or a backup switch, for example, when the switch 101 has just been powered on, the value of the stack state 402 is INITIAL.

FIG. 5 is an illustrative view of a port link state management table 223 held by the switch 101K in Embodiment 1 of this invention.

The port link state management table 223 is a table to manage the states of the ports 201 of switches 101. The port link state management table 223 shown in FIG. 5 includes records corresponding to the ports 201 of the switches 101K and 101L forming a stack; each record includes a switch 501, a port number 502, and a port state 503.

The switch 501 is, like the switch 301 in FIG. 3, identification information on the switch 101. The port number 502 is identification information on a port 201 of the switch 101. The port state 503 is information indicating the state of the port 201; the value is either UP or DOWN. When the port 201 is connected with another port 201 and they can communicate with each other, the port states 503 of these ports 201 are UP. When a failure occurs in the port 201, when a failure occurs in a port 201 in a different switch 101 connected with the port 201, or when the port 201 is not connected with any port, the port state 503 of the port 201 is DOWN.

Furthermore, even if no failure occurs in the port 201 and the link is correctly connected, when the port shutdown setting 307 of the port is SHUTDOWN, the port state 503 of the port 201 is DOWN. A port 201 indicating DOWN in the port state 503 cannot send or receive a data frame, a ring health check frame, a stack health check frame, or a flush control frame.

FIG. 6 is an illustrative view of a ring port state management table 224 held by the switch 101K in Embodiment 1 of this invention.

The ring port state management table 224 is a table to manage the states of the ring ports in a node. Specifically, the ring port state management table 224 shown in FIG. 6 includes records corresponding to the ring ports of the node 102D including the switch 101K; each record includes a switch 601, a ring ID 602, a ring port number 603, a ring port 604, a ring port state 605, and a ring failure state 606.

The switch 601, the ring ID 602, and the ring port number 603 respectively correspond to the switch 301, the ring ID 304, and the ring port number 306 in FIG. 3.

The ring port 604 indicates whether the ring port is a primary port or a secondary port. In the example of FIG. 6, the port 201A is a primary port and the port 201D is a secondary port. The ring port 604 may be determined by any criteria as far as one of the two ring ports in a master node is determined to be a primary port and the other ring port is determined to be a secondary port without exception. For example, the ring port in the switch 101 assigned a smaller switch number may be determined to be a primary port. If two ring ports are provided in the same switch 101 (meaning that a stack is not configured), a port assigned the smaller switch number may be determined to be a primary port.

The ring port state 605 indicates whether the state of the ring port is forwarding or blocking. In the example of FIG. 6, the port 201A is in the forwarding state and the port 201D is in the blocking state. A port 201 in the forwarding state sends or receives data frames including user data as well as frames for controlling or managing the ring, such as later-described health check frames and flush control frames. In contrast, a port 201 in the blocking state sends or receives frames for controlling or managing the ring but does not send or receive data frames.

In the initial state, one of the two ring ports in a master node should be in the forwarding state and the other should be in the blocking state. For example, the primary port may be in the forwarding state and the secondary port may be in the blocking state. In contrast, both of the two ring ports in a transit node are initially in the blocking state and upon receipt of a flush control frame, they are both changed to the forwarding state.

The ring failure state 606 indicates whether any failure occurs in the ring the node belongs to. In the example of FIG. 6, there is no failure in the ring 103C (meaning that the ring 103C is normal).

FIGS. 3 to 6 illustrate information held by the switch 101K shown in FIG. 2A. As indicated in these examples, a switch 101 configured for a stack holds information on the switch paired with to form a stack in addition to information on the switch 101 holding the information. For the purpose, the master switch and the backup switch forming a stack each communicate information about itself with the other to synchronize the information in the tables. Accordingly, the switch 101L shown in FIG. 2A holds the identical information to the information illustrated in FIGS. 3 to 6 as far as no failure occurs in the stack.

However, the ring failure states 606 in the ring port state management table 224 are not shared by the switches 101K and 101L. As will be described later, when the backup switch is changed to a new master switch upon occurrence of a failure in the master switch, the new master switch detects the ring failure again to confirm that the ring is failed.

In contrast, switches 101 which belong to a ring but are not configured for a stack (for example, the switches 101M and 101N in FIG. 2A) do not hold information related to stack. For example, the configuration tables 221 of the switches 101M and 101N each include configuration information about the two ring ports of the switch 101M or 101N and do not include stack priorities 302 or stack port numbers 303. The switches 101M and 101N do not hold a stack state management table 222. The port link state management tables 223 of the switches 101M and 101N each include only the information on the ports of the switch 101M or 101N holding the table. The ring port state management tables 224 of the switches 101M and 101N each include only information on the two ring ports of the switch 101 holding the table.

In the meanwhile, the ring port state management tables 224 of the switches 101M and 101N of transit nodes do not include ring failure states 606 in this embodiment.

Now, with reference to FIGS. 2A to 6, operations of each switch 101 in the normal state (meaning the state where no failure occurs in any part of the ring 103C) are described.

In the example of FIG. 2A, the node 102D is a master node of the ring 103C and the nodes 101M and 101N are transit nodes. The node 102D is a stacked node configured with the switches 101K and 101L; in the stack, the switch 101K is a master switch and the switch 101L is a backup switch.

First, a master node and a transit node are described. The master node is only one node existing in one ring and monitors the ring for any failure using health check frames. Specifically, the master node sends health check frames from two ring ports and checks whether to receive the health check frames in the both directions within a predetermined time. If no failure is detected from the ring, the master node configures one of the two ring ports into a forwarding state and the other into a blocking state and upon detection of a failure, it changes the state of the ring port in the blocking state to a forwarding state.

As to the transit node, upon receipt of a health check frame at one of the ring ports, the transit node transfers the health check frame from the other ring port to an adjacent node on the ring. Both of the two ring ports of a transit node send and receive data frames. The master node conducts failure monitoring by checking receiving conditions of the health check frames transferred around the transit nodes. The transit nodes do not need to conduct failure monitoring using ring health check frames.

Next, a master switch and a backup switch are described. The master switch is a switch for controlling all member switches forming a stack and their functions; the backup switch is a switch that operates in accordance with the control of the master switch. In particular, a master switch of a stacked node belonging to a ring determines the state (forwarding or blocking) of the ring port of the master switch and also determines the state of the ring port of the backup switch. If the node is a master node, the master switch performs processing to implement the functions of a master node. The backup switch becomes a master switch when a failure occurs in the master switch. Specifically, the master switch and the backup switch each send health check frames to the other from the stack port and when one switch does not receive a health check frame within a predetermined time, it determines that a failure occurs in the other switch.

In the following description, the health check frame sent and received by the master node for the purpose of failure monitoring for a ring is referred to as ring health check frame; the health check frame exchanged between a master switch and a backup switch for the purpose of failure monitoring for the stack is referred to as stack health check frame.

In the example of FIG. 2A, the mater switch 101K in the master node 102D sends ring health check frames from the ports 201A and 201B. The ring health check frame sent from the port 201A is transferred serially by the switches 101N and 101M of transit nodes and arrives at the port 201D of the backup switch 101L. The backup switch 101L sends the received ring health check frame from the port 201E to the port 201B of the master switch 101K via the stack link 104L.

Reversely, the ring health check frame sent from the port 201B is transferred serially by the backup switch 101L, the switches 101M and 101N of transit nodes and arrives at the port 201A of the master switch 101K. When receiving the ring health check frame sent from the port 201A at the port 201B and the ring health check frame sent from the port 201B at the port 201A, the master switch 101K determines that no failure occurs in the ring 103C.

When no failure occurs in the ring 103C, the port 201A which is the primary port of the two ring ports of the master node 102D is in a forwarding state and the port 201D of the secondary port is in a blocking state. In these conditions, described hereinafter is the flow of a data frame in the case where the node 102D receives a data frame from the switch 101O and the data frame is addressed to a network device (not shown) connected with the link 104S.

A data frame sent from the switch 101O is received at the port 201C via the link 104P or at the port 201F via the link 104Q. If the port 201F receives a data frame, the switch 101L sends the data frame from the port 201E to the switch 101K since the port 201D is in a blocking state. The switch 101K sends the data frame received at the port 201B or 201C from the port 201A. The switch 101N transfers the data frame received via the link 104O to the destination connected with the link 104S.

If the destination of the data frame is a network device connected with the link 104R, the switch 101N transfers the received data frame to the switch 101M. The switch 101M transfers the received data frame to the network device connected with the link 104R. In this way, when no failure occurs in the ring 103C, a transmission path for data frames can be provided between any two nodes belonging to the ring 103C, while data frames are prevented from circulating around the ring 103C since the port 201D is in the blocking state.

Next, operations of switches 101 when a failure occurs in the ring are described.

Figure 7:
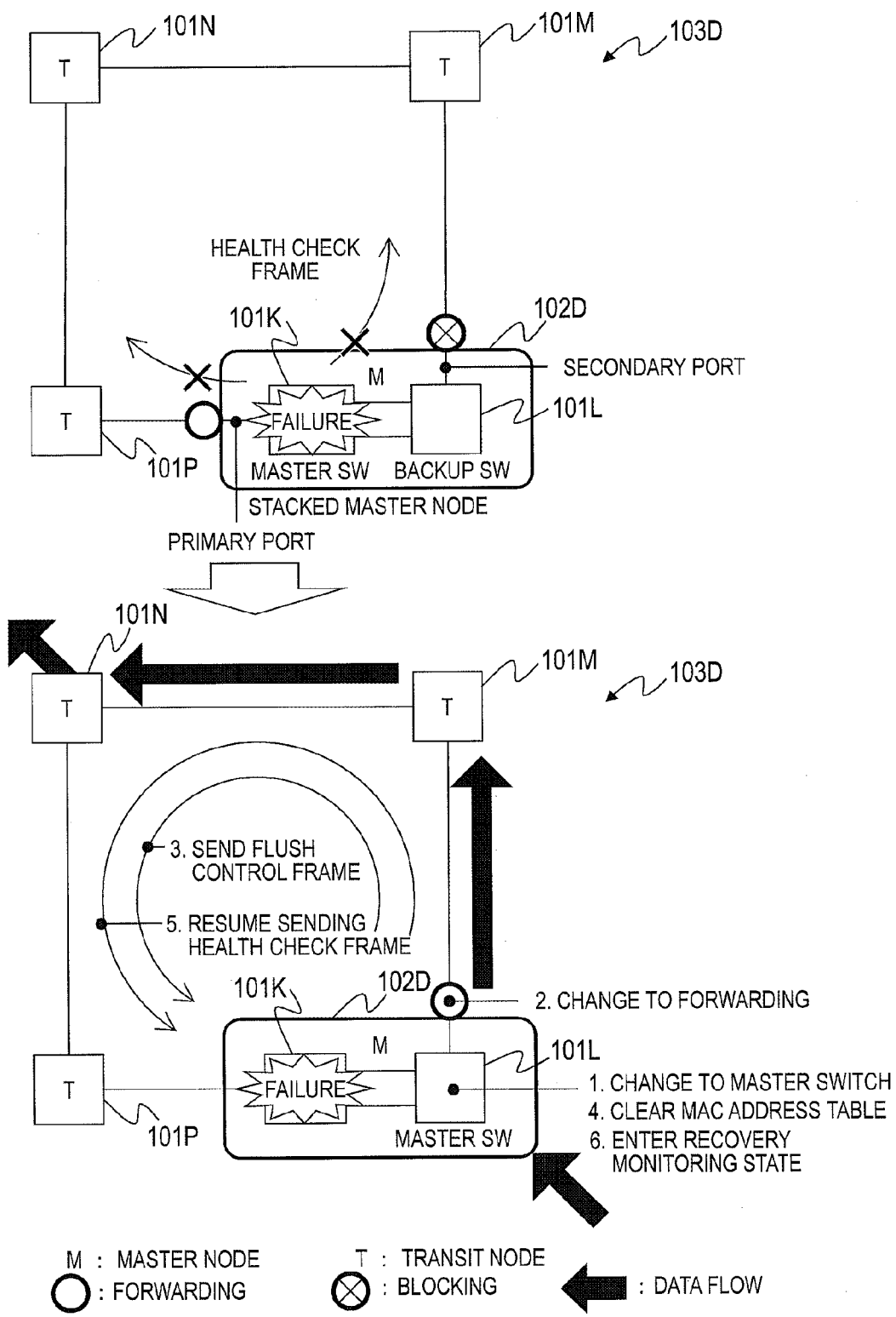
FIG. 7 is an explanatory diagram illustrating operations when a failure occurs in a master switch configured for a master node in the network system of Embodiment 1 of this invention.

FIG. 7 is an explanatory diagram illustrating operations when a failure occurs in a master switch configured for the master node in the network system of Embodiment 1 of this invention.

The ring 103D illustrated in FIG. 7 includes a switch 101P in addition to the same switches 101K to 101N in the ring 103C shown in FIG. 2A. Except that the switch 101K is connected with the switch 101P and the switch 101P is connected with the switch 101N, the connections among the switches 101 in the ring 103D are the same as those in the ring 103C. Although FIG. 7 omits the ports 201 and other components, the switches 101K to 101N have the same configurations as those described with reference to FIGS. 2A to 6; the switch 101P has the same configuration as the switch 101N.

Described hereinafter is an example where a data frame received by the master node 102D from a network device (for example, the switch 101O) in the external of the ring 103D is transmitted through the ring 103D and sent from the switch 101N to a network device in the external of the ring 103D. The switch 101K of the master switch conducts failure monitoring using ring health check frames. When no failure occurs in the ring, a data frame is sent from the port 201A in the forwarding state and serially transferred by the switches 101P and 101N. Furthermore, the switches 101K and 101L conduct failure monitoring with each other using stack health check frames. The state in which the above-described failure monitoring is being conducted may be referred to as failure monitoring state.

Later, when a failure occurs in the switch 101K, neither ring health check frame nor stack health check frame is sent from the switch 101K. When the switch 101L of the backup switch does not receive a stack health check frame from the switch 101K, it detects the failure of the switch 101K and changes the stack state 402 of the switch 101L from BACKUP to MASTER in its own stack state management table 222. Through this operation, the switch 101L becomes a new master switch.

Next, the switch 101L changes the ring port state 605 of the ring port 201D from BLOCKING to FORWARDING in its own ring port state management table 224. Further, the switch 101L sends a flush control frame to the ring 103D. The flush control frame sent from the switch 101L is serially transferred to the switches 101M, 101N, and 101P. The switch 101L and the switches 101M, 101N, and 101P that have received the flush control frame clear their own MAC address tables (not shown).

As a result, the transfer path for data frames is switched to a path starting from the switch 101L to the switch 101N via the switch 101M. Although the path starting from the switch 101K to the switch 101N via the switch 101P cannot be used because of occurrence of a failure in the switch 101K, the above-described switching of the path can continue transfer of data frames. Even though the ring port 201D is changed to a forwarding state, data frames will not circulate around the ring 103D because a failure occurs in the switch 101K.

Further, the switch 101L starts sending ring health check frames in opposite directions (the direction to the switch 101K and the direction to the switch 101M) because it has become a master switch. The switch 101L continues failure monitoring using stack health check frames. Accordingly, when the switch 101K is still failed, the switch 101L knows that the ring 103C is in a failed state, and when the switch 101K recovers from the failure, the switch 101L can notice the recovery. In the following description, this state in monitoring for recovery from a failure is referred to as recovery monitoring state.

Figure 8:
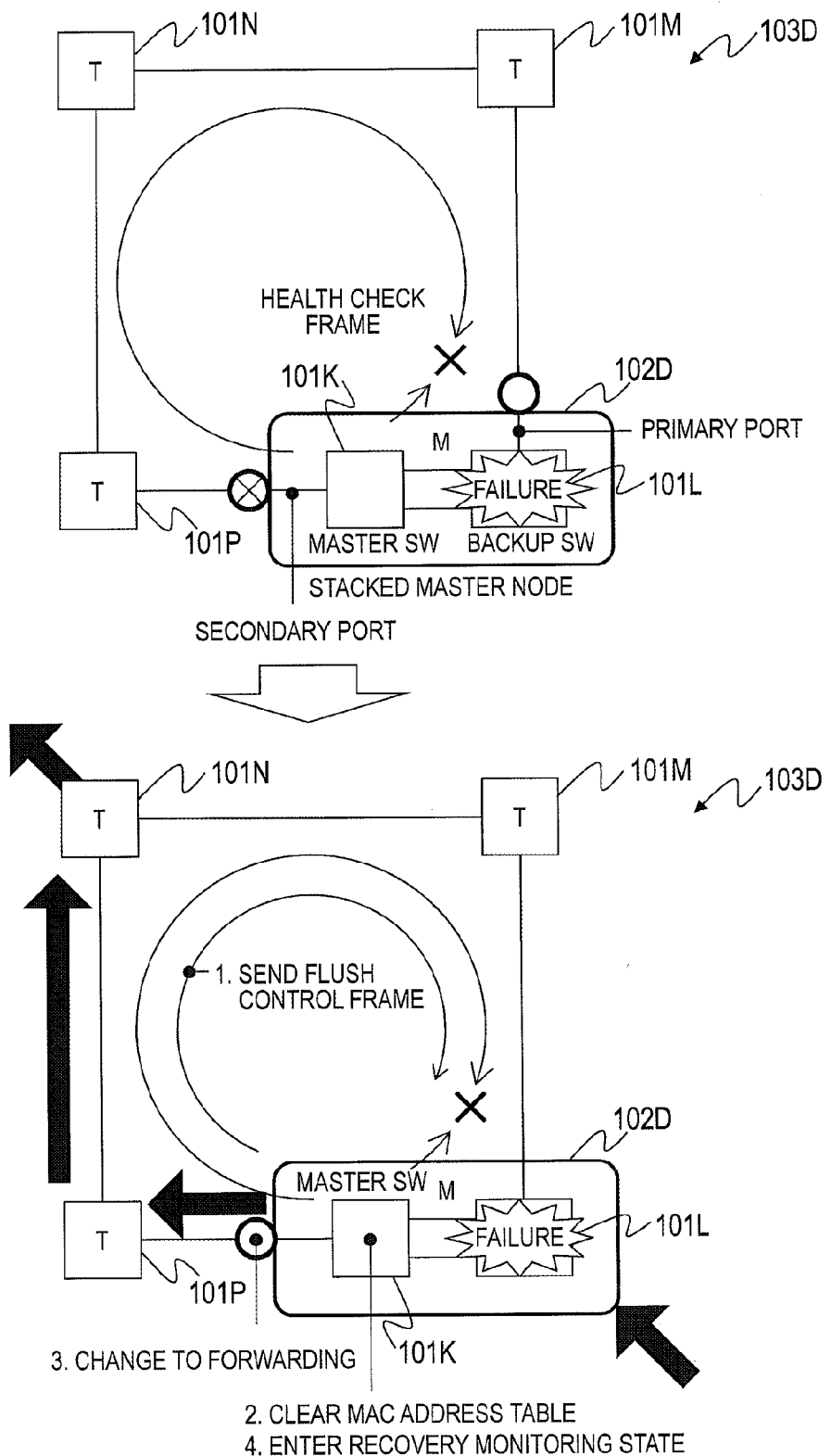
FIG. 8 is an explanatory diagram illustrating operations when a failure occurs in a backup switch configured for a master node in the network system of Embodiment 1 of this invention.

FIG. 8 is an explanatory diagram illustrating operations when a failure occurs in a backup switch configured for a master node in the network system of Embodiment 1 of this invention.

The ring 103D shown in FIG. 8 is the same as the ring 103D shown in FIG. 7, except that the port 201A of the switch 101K, which is one of the two ring ports of the node 102D, is a secondary port and the port 201D of the switch 101L is a primary port. However, this change is merely for explanation; in the case where the ring ports 604 are determined in accordance with the stack priorities 302, the primary port and the secondary port are not changed in actual cases unless the configuration table 221 is altered.

In this example, when no failure occurs in the ring 103D, a data frame sent from the node 102D to the switch 101N is serially transferred by the switches 101L, 101M, and 101N because the port 201D is in a forwarding state and the port 201A is in a blocking state.

The switch 101K of the master switch conducts failure monitoring using ring health check frames. Furthermore, the switches 101K and 101L conduct failure monitoring for the stack using stack health check frames. Upon detection of a failure of the switch 101L through the failure monitoring for the stack, the switch 101K sends a flush control frame to the ring 103D. The switches 101P, 101N, and 101M that have received the flush control frame clear their own MAC address tables.

Further, the switch 101K changes the ring port state 605 of the ring port 201A from BLOCKING to FORWARDING in the own ring port state management table 224.

Through this operation, the transfer path for data frames is switched to the path from the switch 101K to the switch 101N via the switch 101P. Although the path from the switch 101L to the switch 101N via the switch 101M cannot be used because of the occurrence of a failure in the switch 101L, the above-described switching of the path can continue transfer of data frames.

The switch 101K enters a recovery monitoring state. Specifically, the switch 101K keeps sending ring health check frames in opposite directions. The switch 101K also keeps conducting failure monitoring using stack health check frames. Accordingly, when the switch 101L recovers from the failure, the switch 101K can detect the recovery.

Figure 9:
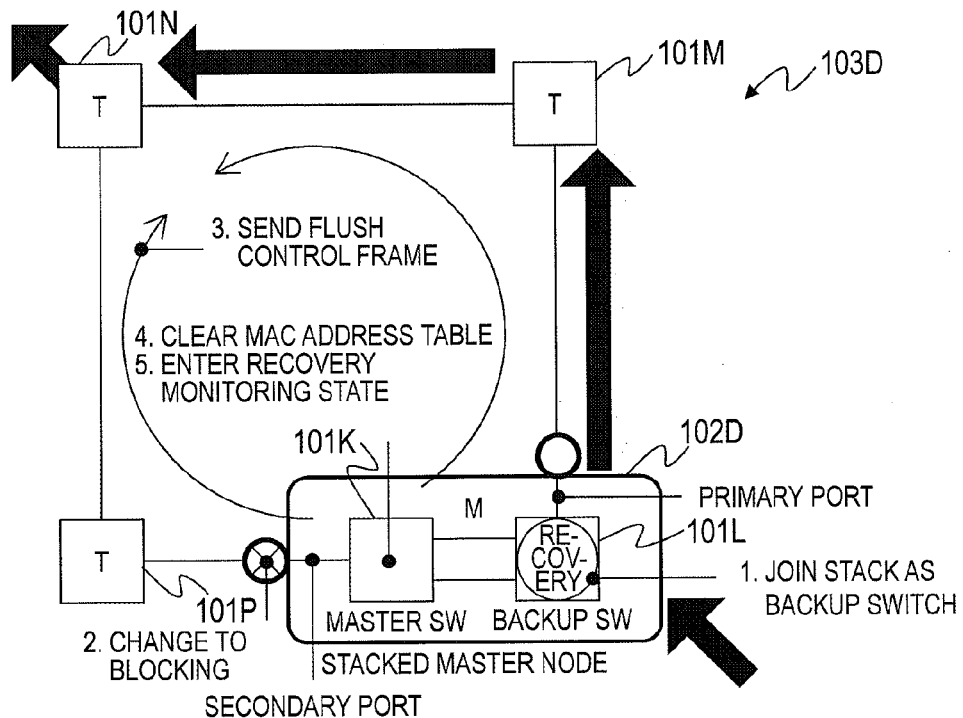
FIG. 9 is an explanatory diagram illustrating operations when a switch configured for a master node in the network system of Embodiment 1 of this invention recovers from a failure.

FIG. 9 is an explanatory diagram illustrating operations when a switch configured for a master node in the network system of Embodiment 1 of this invention recovers from a failure.

Specifically, FIG. 9 illustrates operations when the switch 101L recovers from the failure illustrated in FIG. 8. Upon recovery from a failure, the switch 101L joins the stack as a backup switch. Next, the switch 101K changes the state of the port 201A of the secondary port to a blocking state. Further, the switch 101K sends a flush control frame. As a result, the MAC address tables of the switches in the ring 103D are cleared. Through these operations, the transfer path for data frames is switched to the path from the switch 101L to the switch 101N via the switch 101M. The switches 101K and 101L enter a failure monitoring state.

Figure 10:
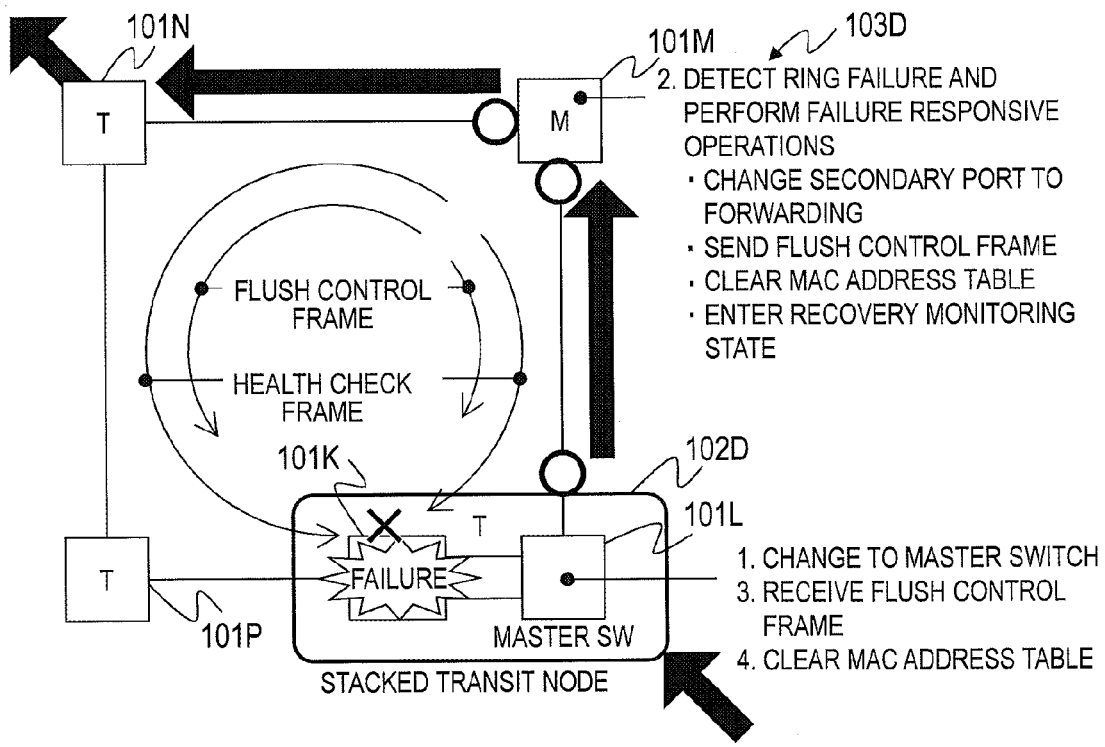
FIG. 10 is an explanatory diagram illustrating operations when a failure occurs in a master switch configured for a transit node in the network system of Embodiment 1 of this invention.

FIG. 10 is an explanatory diagram illustrating operations when a failure occurs in a master switch configured for a transit node in the network system of Embodiment 1 of this invention.

Although the connections among the switches 101 in the ring 103D shown in FIG. 10 are the same as those in FIGS. 7 to 9, the configuration in FIG. 10 is different in the points that the switch 101M is a master node and that the switches 101K and 101L are a stacked transit node. It is assumed that the switch 101K is a master node at the time of occurrence of a failure.

In this example, upon occurrence of a failure in the switch 101K, the backup switch 101L changes to a master switch. The switch 101M that has detected a failure in the ring through failure monitoring using ring health check frames performs failure responsive operations. Specifically, the switch 101M changes the state of the secondary port to a forwarding state and sends a flush control frame. As a result, the MAC address tables in the switch 101M and the switches 101 (including the switch 101L) that have received the flush control frame are cleared.

Through these operations, the transfer path for data frames is switched to a path from the switch 101L to the switch 101N via the switch 101M. The switch 101M enters a recovery monitoring state.

Figure 11:
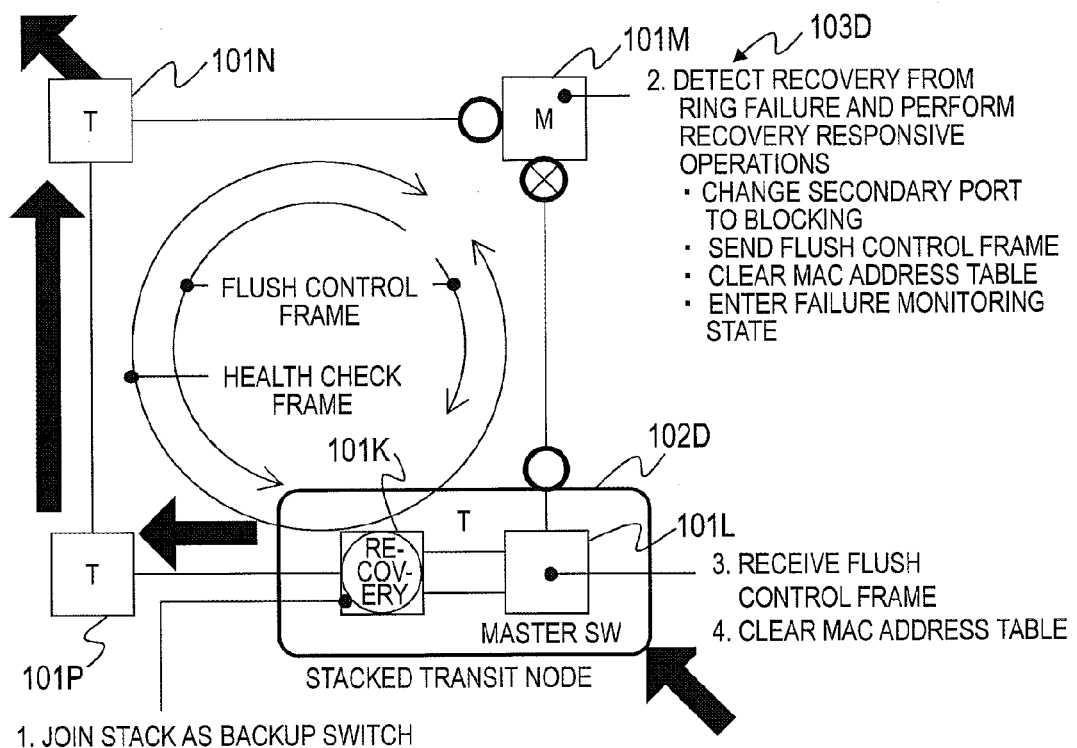
FIG. 11 is an explanatory diagram illustrating operations when a switch configured for a transit node in the network system of Embodiment 1 of this invention recovers from a failure.

FIG. 11 is an explanatory diagram illustrating operations when a switch configured for a transit node in the network system of Embodiment 1 of this invention recovers from a failure.

Specifically, FIG. 11 illustrates operations when the switch 101K recovers from the failure illustrated in FIG. 10. Upon recovery from a failure, the switch 101K joins the stack as a backup switch. Subsequently, the switch 101M detects a recovery from the failure in the ring through failure monitoring using ring health check frames and performs recovery responsive operations. Specifically, the switch 101M changes the state of the secondary port to a blocking state and sends a flush control frame. As a result, the MAC address tables in the switch 101M and the switches 101 (including the switch 101L) that have received the flush control frame are cleared.

Through these operations, the transfer path for data frames is switched to the path from the switch 101L to the switch 101N via the switch 101P. The switch 101M enters a failure monitoring state.

It should be noted that, as illustrated in FIGS. 10 and 11, the switch 101K served as a master switch until occurrence of the failure joins the stack as a backup switch after recovery from the failure in this embodiment. However, such an operation is an example; in actual cases, the switch 101K may join the stack as a master switch again. For example, upon detection of a recovery of the switch 101K, the switch 101K having a higher priority level in the stack priority 302 may become a master switch. In this case, the switch 101L changes from a master switch to a backup switch. The same applies to the case where the node 102D is a master node.

Next, specific processing performed by each module of a switch 101 to carry out the operations described hereinabove is explained with reference with flowcharts.

Figure 12:
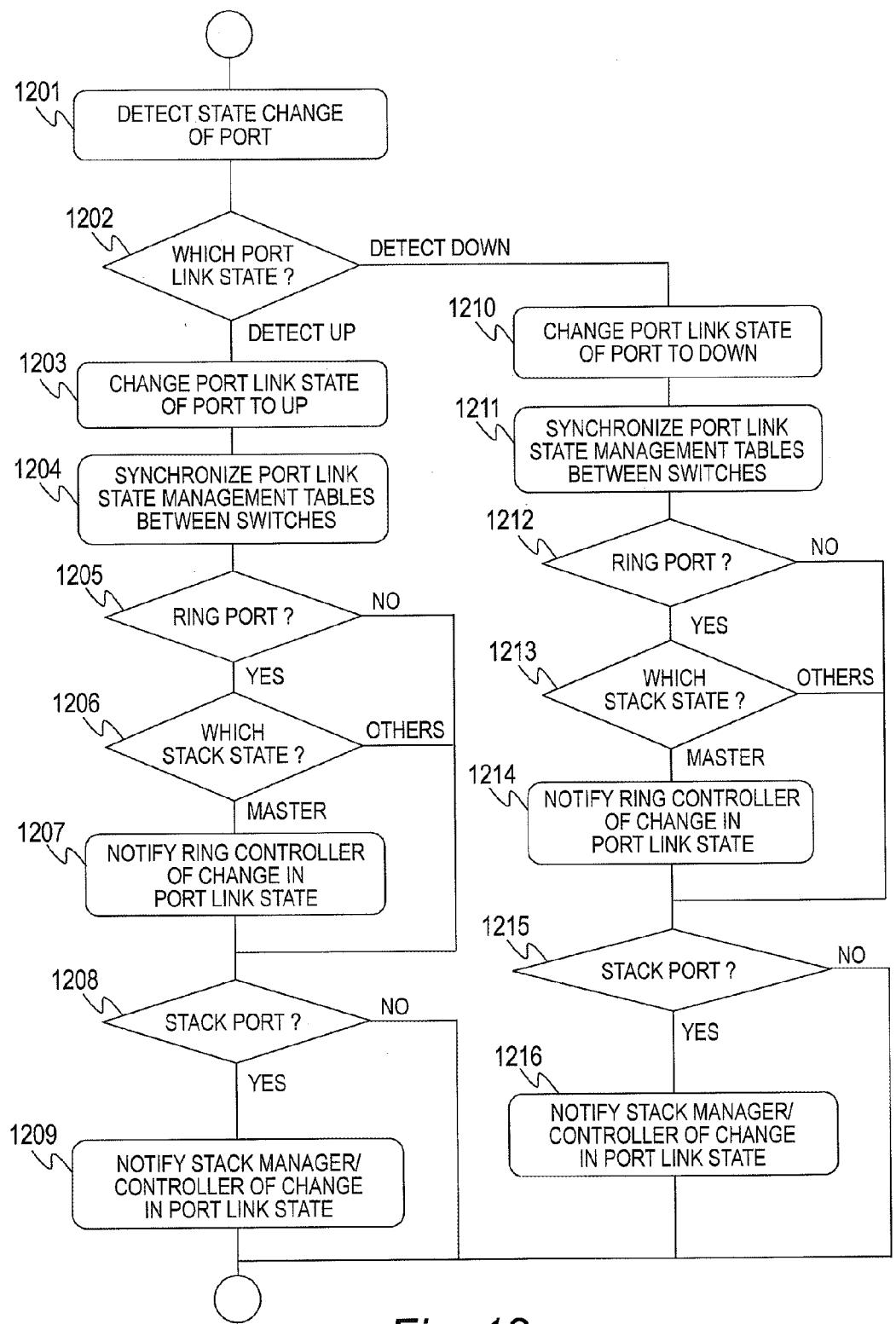
FIG. 12 is a flowchart of processing performed by an interface controller in Embodiment 1 of this invention.

FIG. 12 is a flowchart of processing performed by the interface controller 214 in Embodiment 1 of this invention.

Upon detection of a state change (link-up or link-down) of a port (Step 1201), the interface controller 214 identifies whether the change is a link-up or a link-down (Step 1202). In the case of detection of a link-up, the interface controller 214 changes the port state 503 of the port (i.e., the port on which the state change has been detected) to UP in the port link state management table 223 (Step 1203).

Next, the interface controller 214 synchronizes the port link state management table 223 between the switches forming a stack (Step 1204). For example, when the interface controller 214 of the switch 101K detects a state change in some port 201, one of the port states 503 associated with the SWITCH 1 is changed at Step 1203 and the switch 101L is notified of the specifics of the change via the stack link 104L at Step 1204. The interface controller 214 of the switch 101L changes the port state 503 of the designated port in the port link state management table 223 in accordance with the notification. Through these operations, the information in the port link state management tables 223 of the two switches forming a stack becomes identical.

Next, the interface controller 214 identifies whether the port is a ring port with reference to the configuration table 221 or the ring port state management table 224 (Step 1205). If the port is a ring port, the interface controller 214 identifies whether the stack state 402 of the switch (i.e., the switch 101 including the interface controller 214 performing this processing) is a master switch with reference to the stack state management table 222 (Step 1206). If the stack state 402 of the switch is MASTER, the interface controller 214 notifies the ring controller 213 of the change in port link state (Step 1207).

Next, the interface controller 214 identifies whether the port is a stack port with reference to the configuration table 221 (Step 1208). If the port is a stack port, the interface controller 214 notifies the stack manager/controller 212 of the change in port link state (S1209).

If the identification at Step 1205 is that the port is not a ring port or the identification at Step 1206 is that the stack state 402 of the switch is not MASTER (meaning it is BACKUP or INITIAL), the interface controller 214 does not execute Step 1207. If the identification at Step 1208 is that the port is not a stack port, the interface controller 214 does not execute Step 1209.

If the identification at Step 1202 is that a link-down has been detected, the interface controller 214 changes the port state 503 of the port to DOWN in the port link state management table 223 (Step 1210). Steps 1211 to 1216 to be executed by the interface controller 214 subsequently to Step 1210 are the same as Steps 1204 to 1209; accordingly, explanation thereof is omitted.

This is the end of the processing performed by the interface controller 214. The interface controller 214 executes the foregoing Steps 1201 to 1216 upon every detection of a state change of a port.

Figure 13:
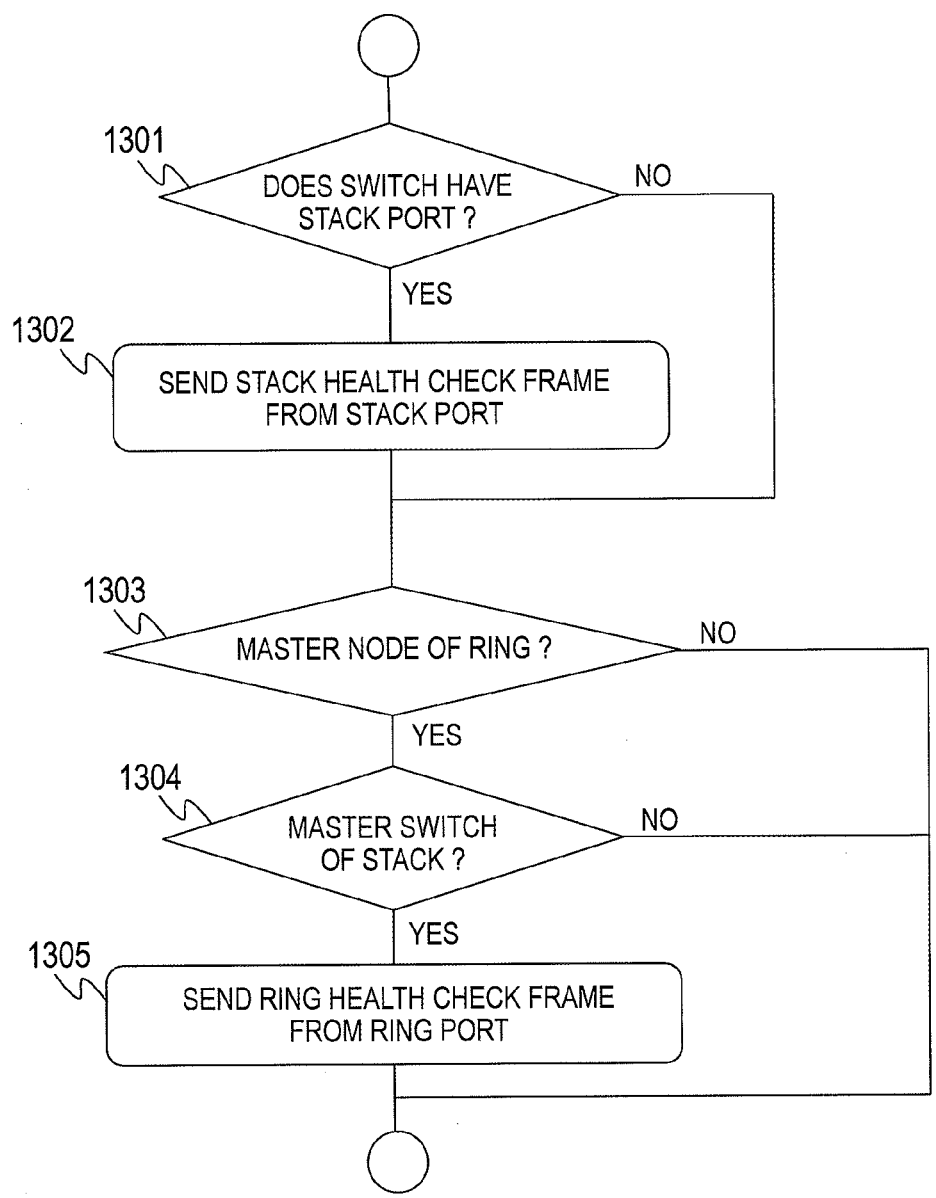
FIG. 13 is a flowchart of processing performed by a protocol common controller in Embodiment 1 of this invention.

FIG. 13 is a flowchart of processing performed by the protocol common controller 211 in Embodiment 1 of this invention.

The protocol common controller 211 determines whether the switch (i.e., the switch 101 including the protocol common controller 211 performing this processing) has a stack port (Step 1301). If the switch has a stack port (meaning that the switch is configured for a stack), the protocol common controller 211 sends a stack health check frame from the stack port (Step 1302). The stack health check frame to be sent includes data such as information indicating that the frame is a stack health check frame, the stack state 402 of the switch, the stack priority 302 of the switch, the identification information of the switch (i.e., the switch 301), and the stack port number 303 of the switch. Each switch 101 communicates information held by the switch, such as information in the tables shown in FIGS. 3 to 6, via the stack link as necessary (for example, by including the information in a stack health check frame) to synchronize the information held by the switch with the other switch.

Next, the protocol common controller 211 identifies whether the switch is in a master node of the ring (Step 1303). If the switch is in a master node of the ring, the protocol common controller 211 identifies whether the switch is a master switch of a stack (Step 1304). If the switch is a master switch of a stack, the protocol common controller 211 sends a ring health check frame from the ring port of the switch (Step 1305). The ring health check frame includes at least information indicating that the frame is a ring health check frame.

If the determination at Step 1301 is that the switch does not have a stack port, the protocol common controller 211 does not execute Step 1302. If the identification at Step 1303 is that the switch is not in a master node of the ring or if the identification at Step 1304 is that the switch is not a master switch of a stack, the protocol common controller 211 does not execute Step 1305.

This is the end of the processing performed by the protocol common controller 211. The protocol common controller 211 performs the foregoing Steps 1301 to 1305 repetitively (for example, periodically). In actual processing, the protocol common controller 211 may execute Steps 1301 and 1302 independently from Steps 1303 to 1305. For example, the intervals for the protocol common controller 211 to send stack health check frames may be different from the intervals to send ring health check frames.

Figure 14:
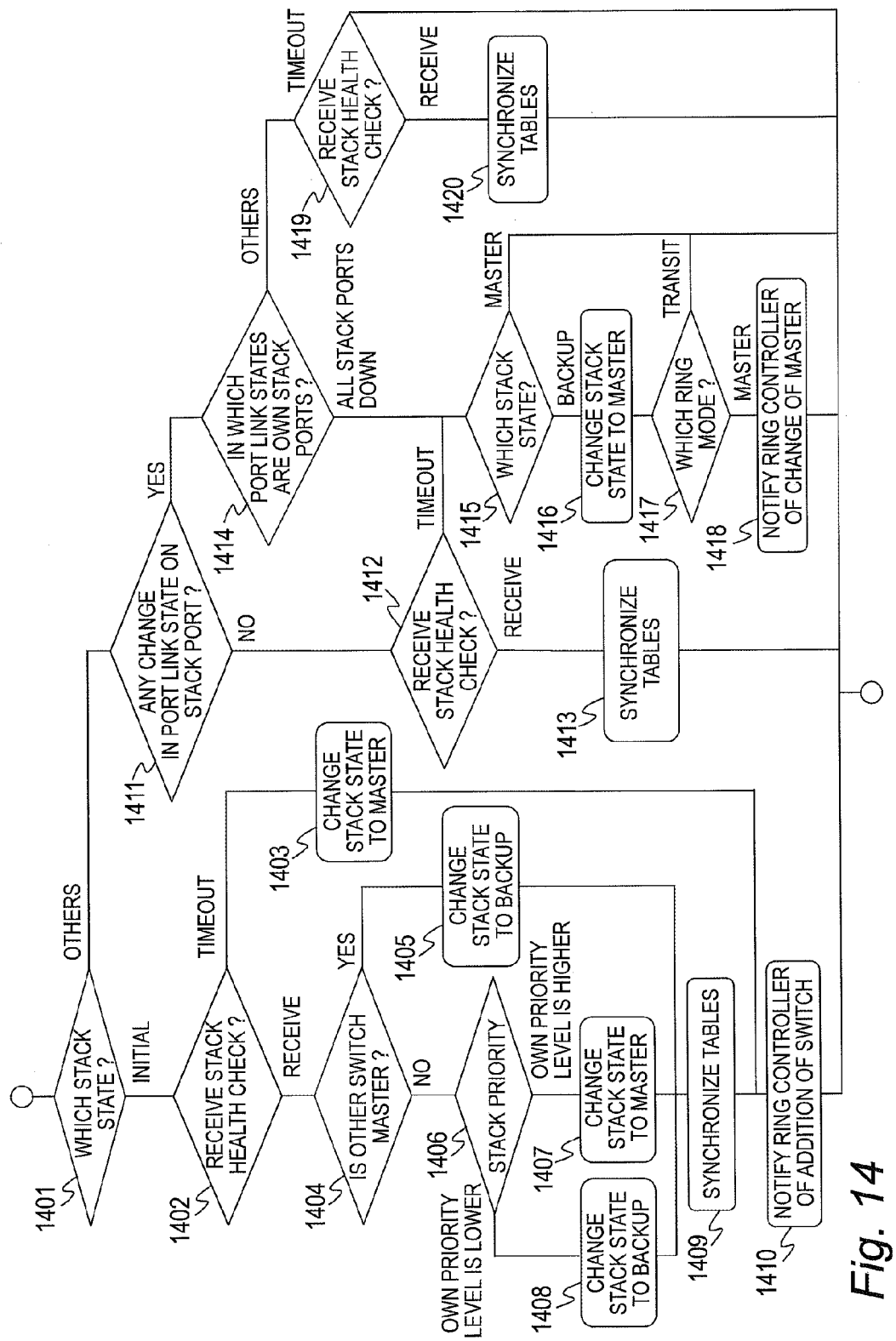
FIG. 14 is a flowchart of processing performed by the stack manager/controller in Embodiment 1 of this invention.

FIG. 14 is a flowchart of processing performed by the stack manager/controller 212 in Embodiment 1 of this invention.

The stack manager/controller 212 identifies whether the stack state 402 of the switch (i.e., the switch 101 including the stack manager/controller 212 performing this processing) is INITIAL (Step 1401). For example, when the switch is joined in the stack as a new member switch (alternatively, a member switch that has recovered from a failure), the stack state 402 of the switch is INITIAL.

If the stack state 402 of the switch is INITIAL, the stack manager/controller 212 determines whether a stack health check frame is received (Step 1402). If the stack manager/controller 212 does not receive a stack health check frame within a predetermined time (namely, in the case of a timeout), a failure might occur in the other switch of the stack the switch belongs to (for example, if the switch is the switch 101K, the other switch is the switch 101L); the switch needs to be a master switch. Accordingly, the stack manager/controller 212 changes the stack state 402 of the switch to MASTER (Step 1403).

If, at Step 1402, the stack manager/controller 212 receives a stack health check frame within a predetermined time, the stack manager/controller 212 identifies whether the state of the other switch is MASTER with reference to the stack state included in the received stack health check frame (Step 1404). If the state of the other switch is MASTER, the stack manager/controller 212 changes the stack state 402 of the switch to BACKUP (Step 1405). For example, as illustrated in FIG. 9 or 11, the stack manager/controller 212 of the switch 101L that has recovered from a failure joins the stack as a backup switch at Step 1405 because the other switch 101K is a master switch.

If identification at Step 1404 is that the state of the other switch is not MASTER, the stack manager/controller 212 compares the stack priorities 302 of the switch and the other switch (Step 1406). If the priority level of the switch is higher, the stack manager/controller 212 changes the stack state 402 of the switch to MASTER (Step 1407); if the priority level of the switch is lower, the stack manager/controller 212 changes the stack state 402 of the switch to BACKUP (Step 1408).

If the stack state 402 is changed at Step 1405, 1407, or 1408, the stack manager/controller 212 synchronizes the port link state management tables 223 and the stack state management tables 222 between the switches forming the stack (Step 1409). This synchronization is achieved by sending information about the switch in the port link state management table 223 and the stack state management table 222 held by the switch to the other switch and updating the information about the other switch in the port link state management table 223 and the stack state management table 222 held by the switch with the information about the other switch in the port link state management table 223 and the stack state management table 222 sent by the other switch. In this regard, all the information about the switch included in the port link state management table 223 and the stack state management table 222 may be sent for the update or only the altered information may be sent for the update. For example, the switch sends a stack health check frame including the altered stack state 402 and the other switch alters its stack state management table 222 based on the received stack state 402 to synchronize the table. Although not clearly mentioned in this embodiment, health check frames for stack are used to periodically synchronize information uniquely owned by each switch (such as MAC learning information).

After the stack state 402 is changed at Step 1403 or the tables are synchronized at Step 1409, the stack manager/controller 212 notifies the ring controller 213 of the addition of the switch (Step 1410).

If the determination at Step 1401 is that the stack state 402 of the switch is not INITIAL (meaning that it is MASTER or BACKUP), the stack manager/controller 212 determines whether the port state 503 of a stack port of the switch has been changed (Step 1411). This state change is notified of at Step 1209 or 1219 in FIG. 12. If the port state 503 has not been changed, the stack manager/controller 212 determines whether a stack health check frame is received (Step 1412). If a stack health check frame is received, the stack manager/controller 212 synchronizes the port link state management tables 223 and the stack state management tables 222 between the switches forming the stack (Step 1413). The synchronization method is the same as that of Step 1409.

If the determination at Step 1411 is that the port state 503 of a stack port of the switch has been changed, the stack manager/controller 212 identifies the current states 503 of the stack ports of the switch (Step 1414). If the port states 503 of all the stack ports are identified as DOWN, the switch is in a state where the switch cannot communicate with the other switch because of a failure in the other switch or a failure in the stack link. In such a situation, if the switch is a backup switch, the switch should become a master switch; accordingly, the stack manager/controller 212 identifies the stack state 402 of the switch (Step 1415). It should be noted that, when a timeout is detected at Step 1412, the stack is also in the same state as described above; accordingly, the stack manager/controller 212 executes Step 1415.

If the identification at Step 1415 is that the stack state 402 is BACKUP, the stack manager/controller 212 changes the stack state 402 of the switch to MASTER (Step 1416). Next, the stack manager/controller 212 identifies whether the ring mode 305 of the switch is MASTER (Step 1417). If the ring mode 305 is MASTER, the stack manager/controller 212 notifies the ring controller 213 that the switch has newly become a master switch (Step 1418).

If the identification at Step 1417 is that the ring mode 305 is TRANSIT, the stack manager/controller 212 does not execute Step 1418. If the identification at Step 1415 is that the stack state 402 is MASTER, the stack manager/controller 212 does not execute Steps 1416 to 1418.

If the determination at Step 1414 is that the port states 503 of all the stack ports are not DOWN (meaning that at least one of the port states 503 of the stack ports is UP), the stack manager/controller 212 determines whether a stack health check frame is received (Step 1419). If a stack health check frame is received, the stack manager/controller 212 synchronizes the port link state management tables 223 and the stack state management tables 222 between the switches forming the stack (Step 1420). The synchronization method is the same as that of Step 1409. For example, the switch may send a stack health check frame including the values of the port state 503 that is determined to have been changed at Step 1411 and the associated switch 501 and port number 502, and the other switch changes the port link state management table 223 based on the received values to achieve synchronization.

If a timeout is detected at Step 1419, the stack manager/controller 212 does not execute Step 1420.

This is the end of the processing of the stack manager/controller 212. The flow of FIG. 14 may be performed periodically, alternatively, may be performed when a new switch is added to the ring network, when the switch is rebooted, or when an instruction to start the processing is received from the external.

Figure 15A:
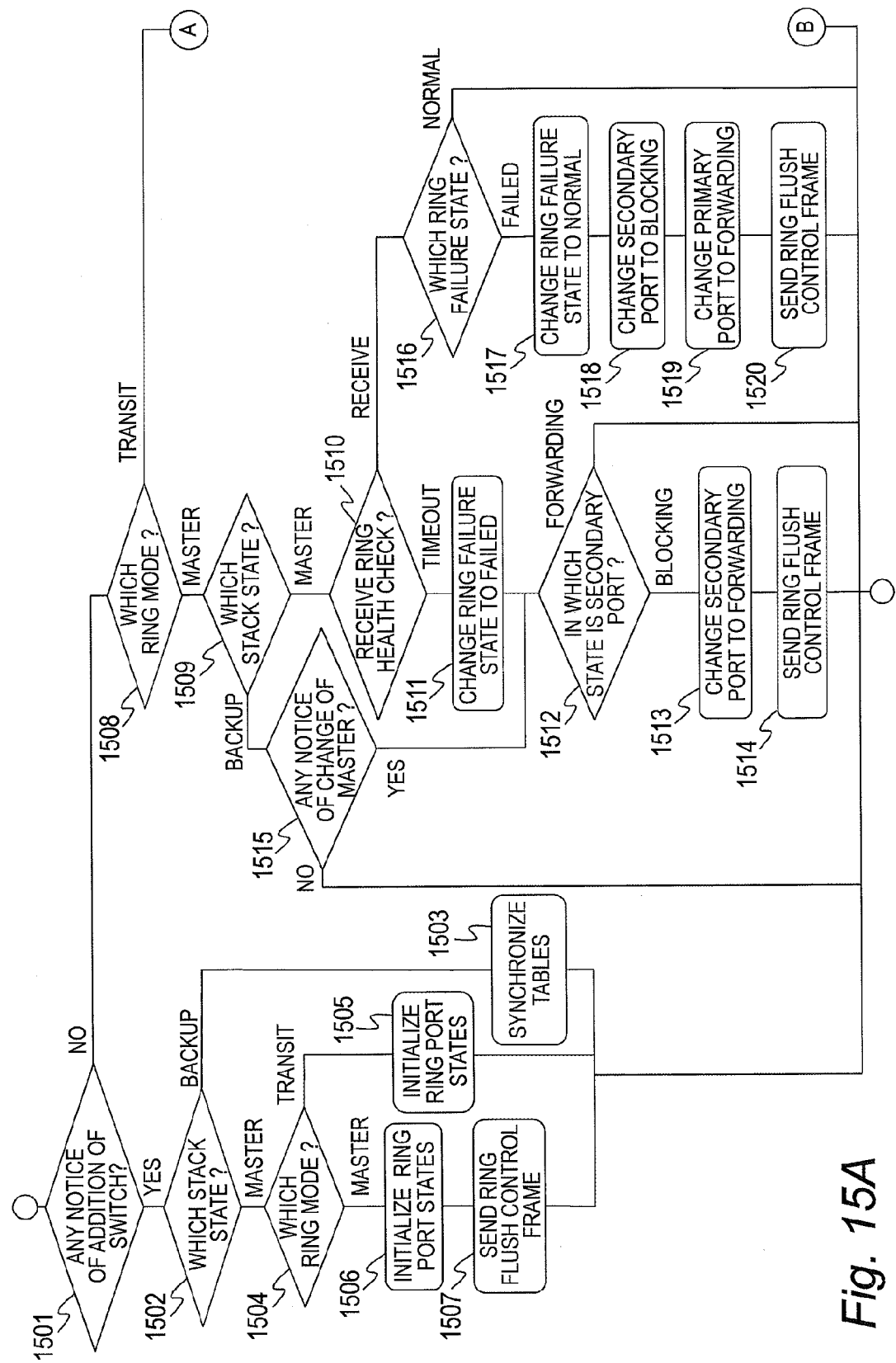
FIGS. 15A and 15B are a flowchart of processing performed by a ring controller in Embodiment 1 of this invention.
Figure 15B:
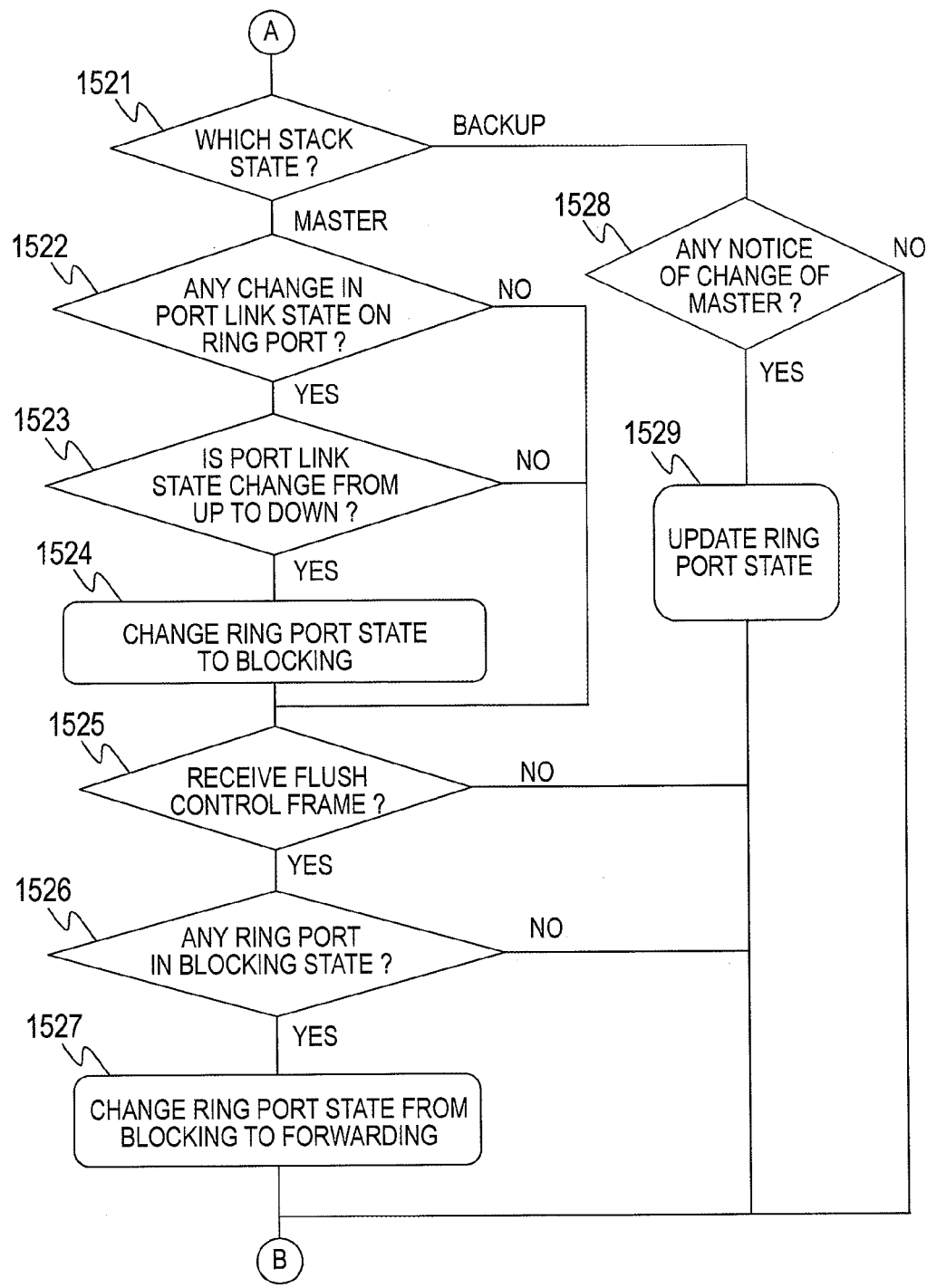

FIGS. 15A and 15B are a flowchart of processing performed by the ring controller 213 in Embodiment 1 of this invention.

First, the ring controller 213 determines whether it receives a notice of addition of a switch (Step 1501). This notice of addition of a switch is sent by the stack manager/controller 212 at Step 1410. Upon receipt of a notice of addition of a switch, the ring controller 213 identifies the stack state 402 of the switch (i.e., the switch 101 the ring controller 213 performing this processing belongs to) (Step 1502). If the stack state 402 is BACKUP, the ring controller 213 synchronizes the ring port state management tables 224 between the switch and the other switch of the stack the switch belongs to (Step 1503). The synchronization method is the same as the one at Step 1409 in FIG. 14.

If the identification at Step 1502 is that stack state 402 is MASTER, the ring controller 213 identifies the ring mode 305 of the switch (Step 1504). If the ring mode 305 is TRANSIT, the ring controller 213 initializes the ring port states (into BLOCKING for both of the primary port and the secondary port) (Step 1505). If the ring mode 305 is MASTER, the ring controller 213 initializes the ring port states (into FORWARDING for the primary port and BLOCKING for the secondary port) (Step 1506) and further, sends a flush control frame for the ring (Step 1507).

If the determination at Step 1501 is that no notice of addition of a switch is received, the ring controller 213 identifies the ring mode 305 of the switch (Step 1508). If the ring mode 305 of the switch is MASTER, the ring controller 213 identifies the stack state 402 of the switch (Step 1509). If the stack state 402 of the switch is MASTER, the ring controller 213 determines whether a ring health check frame is received (Step 1510). If a timeout is detected at Step 1510, a failure occurs in some part of the ring the switch belongs to (for example, the other switch of the stack the switch belongs to or a transit node in the ring); accordingly, the ring controller 213 changes the ring failure state 606 of the switch to FAILED (Step 1511).

Next, the ring controller 213 identifies whether the ring port state 605 of the secondary port of the node the switch belongs to is BLOCKING (Step 1512). If the ring port state 605 of the secondary port is BLOCKING, the ring controller 213 changes the ring port state 605 of the secondary port to FORWARDING (Step 1513). Through this operation, the state change of the secondary port illustrated in FIG. 8 is completed. Next, the ring controller 213 sends a flush control frame for the ring (Step 1514).

Now, processing at Step 1513 in some cases different from the cases of FIGS. 7 and 8 is described. Although FIG. 8 illustrates an example where a failure occurs in the switch 101L of a backup switch, this processing is also performed when the switch 101L is normal and a failure occurs in one of the transit nodes (for example, the switch 101M), so that the ring port state 605 of the secondary port 201A is changed to FORWARDING. As a result, the communication path is switched but a loop that circulates a data frame is not generated because of the failure in the transit node.

In the case where, as illustrated in FIG. 7, the port 201A of the master switch 101K is a primary port and the port 201D of the backup switch 101L is a secondary port, when a failure occurs in one of the transit nodes instead of the master switch 101K or the backup switch 101L, the ring controller 213 of the master switch 101K determines to change the state of the port 201D from BLOCKING to FORWARDING and sends an instruction for the change to the backup switch 101L using the stack port 201B. The ring controller 213 of the backup switch 101L changes the state of the port 201D to FORWARDING in accordance with the received instruction. As a result, the communication path is switched without generating a loop, like the foregoing example.

In the case where the port 201A of the master switch 101K is a primary port and the port 201D of the backup switch 101L is a secondary port as illustrated in FIG. 7, when a failure occurs in the backup switch 101L instead of the master switch 101K, the ring controller 213 of the master switch 101K also determines to change the state of the port 201D from BLOCKING to FORWARDING and sends an instruction for the change. However, the ring controller 213 of the backup switch 101L may not be able to execute the control in accordance with the received instruction because of the failure. Even in such a situation, the communication path can be switched using a switch other than the backup switch 101L, but a loop is not generated because of the failure in the backup switch 101L.

If the identification at Step 1509 is that the stack state 402 of the switch is BACKUP, the ring controller 213 determines whether a notice of change of the master is received (Step 1515). This notice is sent at Step 1418 by the stack manager/controller 212 (refer to FIG. 14). Upon receipt of the notice of change of the master, the ring controller 213 performs the processing followed by Step 1512 because the switch is changed from a backup switch to a master switch (meaning that a failure occurs in the switch paired with the switch so that the ring the switch belongs to is also failed). Through these operations, the state change of the secondary port illustrated in FIG. 7 is completed. If a notice of change of the master is not received, the switch is still a backup switch; accordingly, the ring controller 213 does not perform Steps 1510 to 1514.

If the identification at Step 1512 is that the ring port state 605 of the secondary port is FORWARDING, the ring controller 213 does not need to change the ring port state 605; accordingly, it does not perform Steps 1513 and 1514. As a result, if the secondary port has been in a forwarding state since before the failure occurs in the other switch of the stack or a transit node, the secondary port is controlled to keep the forwarding state after the occurrence of the failure.

Upon receipt of a ring health check frame at Step 1510, the ring controller 213 determines whether the ring failure state 606 of the switch is FAILED (Step 1516). If the ring failure state 606 is FAILED, the receipt of the ring health check frame at Step 1510 means that a failure had occurred in the ring the switch belongs to but the failure has been solved; accordingly, the ring controller 213 changes the ring failure state 606 of the switch to NORMAL (Step 1517).

Next, the ring controller 213 changes the ring port state 605 of the secondary port to BLOCKING (Step 1518), and changes the ring port state 605 of the primary port to FORWARDING if it is BLOCKING (Step 1519), and sends a flush control frame for the ring (Step 1520). Through these operations, the state change of the secondary port illustrated in FIG. 9 is completed. Like in Step 1513, if the port to be controlled at Step 1518 or 1519 is in the backup switch, the ring controller 213 of the master switch sends an instruction to change the ring port state 605 to the backup switch and the ring controller 213 of the backup switch changes the ring port state 605 in accordance with the instruction.

If the identification at Step 1516 is that the ring failure state 606 of the switch is NORMAL, the ring port state 605 of the primary port has already been set to FORWARDING and the ring port state 605 of the secondary port has been set to BLOCKING. To keep these states, the ring controller 213 does not need to perform Steps 1517 to 1520.

As understood from the above, in a stacked master node in this embodiment, when the ring is in a normal state, the master switch controls one of the two ring ports to be in a forwarding state and the other to be in a blocking state and, upon detection of a failure in the ring, controls both of the ring ports to be in forwarding states (Step 1513). Specifically, if the ring port of the master switch is in a blocking state, the master switch changes the state of the port to a forwarding state upon detection of a failure in the ring; if the ring port of the backup switch is in a blocking state, the master switch instructs, upon detection of a failure in the ring, the backup switch to change the state of the ring port to a forwarding state, while maintaining the forwarding state of the ring port of the master switch. Then, upon detection of recovery of the ring from the failure, the master switch in the master node controls one of the ring ports to be in a forwarding state and the other port to be in a blocking state again (Steps 1518 and 1519).

In this embodiment, one of the two ring ports in the master node is assigned an attribute of primary port and the other is assigned an attribute of secondary port (refer to the ring ports 604); the primary port is controlled to be in the forwarding state when the ring is either normal or failed and the secondary port is controlled to be in the blocking state when the ring is normal and to be in the forwarding state when the ring is failed. However, such control is an example; any control may be employed as far as one is controlled to be in a forwarding state and the other is controlled to be in a blocking state when the ring is normal and the both of them are controlled to be in a forwarding state when the ring is failed.

If the identification at Step 1508 is that the ring mode 305 of the switch is TRANSIT, the ring controller 213 identifies the stack state 402 of the switch (Step 1521). If the stack state 402 of the switch is MASTER, the ring controller 213 determines whether the port state 503 of one of the ring ports of the transit node the switch belongs to is changed (Step 1522). This state change is notified of at Step 1207 or 1214 in FIG. 12. If the port state 503 of one of the ring ports is changed, the ring controller 213 identifies whether the change is from UP to DOWN (Step 1523). If the change is from UP to DOWN, the ring controller 213 changes the ring port state 605 of the ring port of which the port state 503 is changed UP to DOWN into BLOCKING (Step 1524). Performing Steps 1522 to 1524 initializes the ring port state 605 of the ring port of which the port state 503 is changed (into BLOCKING) to prevent generation of a loop in the ring network.

If the port states 503 of the ring ports of the transit node are not changed (Step 1522) or if one of them is changed but the change is from DOWN to UP (Step 1523), the ring controller 213 does not perform Step 1524.

Subsequently, the ring controller 213 determines whether a flush control frame is received (Step 1525). If a flush control frame is received, the ring controller 213 determines whether the transit node including the switch has a ring port in a blocking state (Step 1526). If a ring port in a blocking state exists, the ring controller 213 changes the ring port state 605 of the ring port to FORWARDING (Step 1527).

If the switch does not receive a flush control frame (Step 1525) or if it receives a flush control frame but the transit node does not have a ring port in a blocking state (Step 1526), the ring controller 213 does not perform Step 1527.

If the identification at Step 1521 is that the stack state 402 of the switch is BACKUP, the ring controller 213 determines whether the switch receives a notice of change of the master (Step 1418 in FIG. 14). If the switch receives a notice of change of the master, it indicates the switch has been changed from a backup switch to a master switch; accordingly, the ring controller 213 updates the ring port state 605 based on the settings of the port (Step 1529).

Specifically, if the state of the ring port in the switch is set by the master switch to a forwarding state before the switch is changed from a backup switch to a master switch, the ring controller 213 updates the ring port state 605 with FORWARDING; if it is set to a blocking state, the ring controller 213 updates the ring port state 605 with BLOCKING.

If the switch does not receive a notice of change of the master, it indicates the switch is still a backup switch; accordingly, the ring controller 213 does not perform Step 1529.

The flow of FIG. 15 may be performed periodically, alternatively, performed when a new switch is added to the ring network, when the switch is rebooted, or when input of an instruction to start the processing is received from the external.

According to the above-described Embodiment 1, in application of stacks to nodes of a ring network, each switch forming a stack properly controls data frame transfer at each port depending on the state of the other switch (whether a failure occurs in the other switch), the own attribute of the switch in the stack (whether the switch is a master switch), the attribute of the node the switch belongs to (whether the node is a master node) to increase the fault tolerance of the ring network.

Embodiment 2

Embodiment 2 of this invention is described. Except for the differences described hereinafter, the components of the network system in Embodiment 2 have the same functions or the same information as the components denoted by the same reference signs; accordingly, the explanation thereof is omitted.

Figure 16:
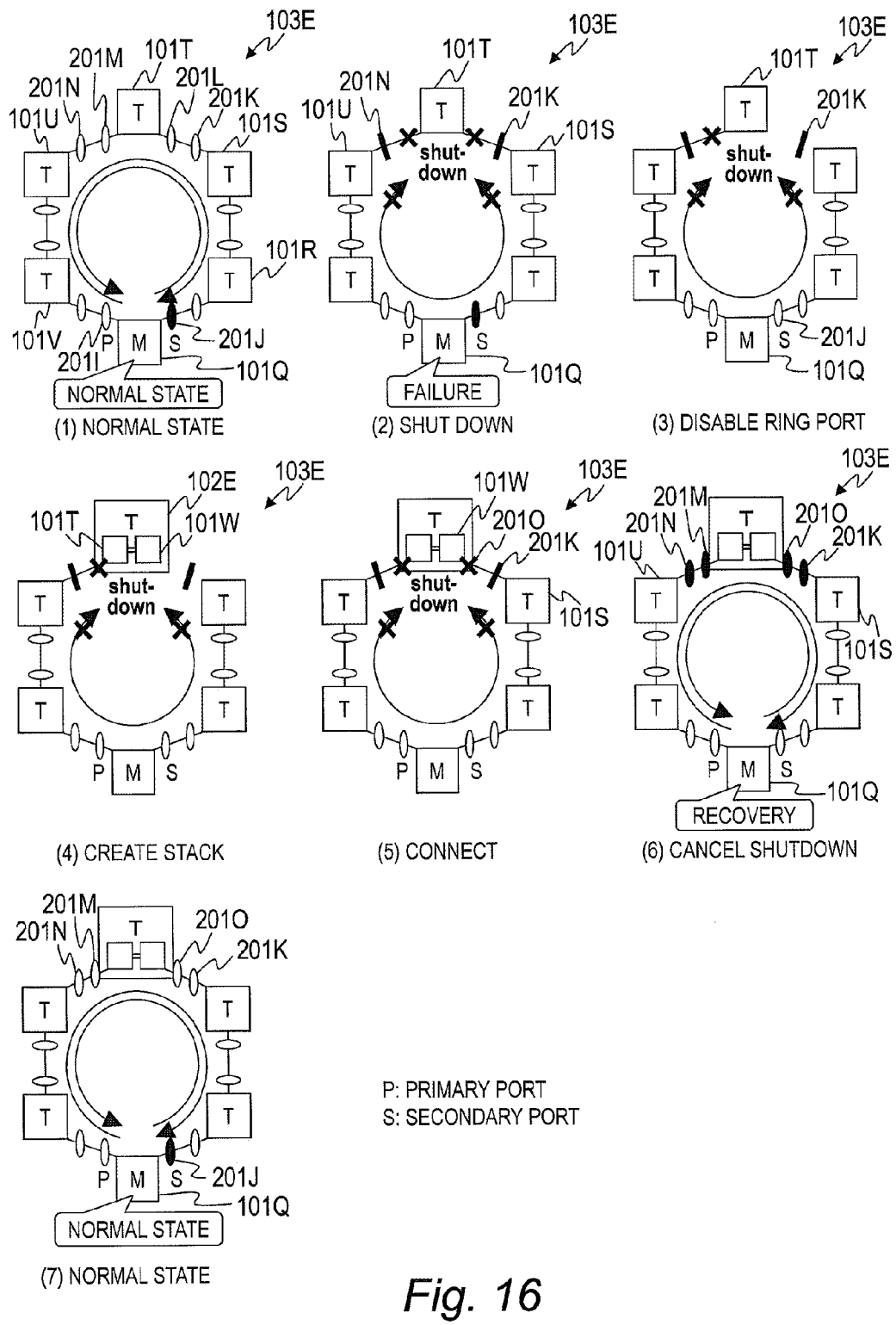
FIG. 16 is an explanatory diagram illustrating adding a switch to a transit node in a network system in Embodiment 2 of this invention.

FIG. 16 is an explanatory diagram illustrating adding a switch to a transit node in the network system in Embodiment 2 of this invention.

With reference to FIG. 16, described is a procedure to create a stacked transit node by adding a new switch to a transit node formed of a stand-alone switch (namely, a switch not configured for a stack) switch among the transit nodes included in a ring.

The network system in this embodiment includes a ring 103E shown in FIG. 16. FIG. 16(1) illustrates the ring 103E in a normal state before adding a switch. This ring 103E is formed by annularly connecting switches 101Q to 101V; the switch 101Q is the master node and each of the switches 101R and 101V is a transit node. Since the switches 101Q to 101V are the same as the switches 101 in Embodiment 1, detailed explanation is omitted.

Like in the master node described in Embodiment 1, in the switch 101Q of the master node in the normal state, the primary port 201I is in a forwarding state and the secondary port 201J is in a blocking state. In these conditions, the ring health check frames sent by the switch 101Q toward the switch 101R and the switch 101V are transferred around the ring 103E to be received by the switch 101Q.

A procedure to change the transit node configured with the switch 101T in the above-described ring 103E to a stacked transit node by newly adding a switch is described. First, as illustrated in FIG. 16(2), in the switches 101S and 101U adjacent to the switch 101T to which a new switch is to be added, the ring ports connected with the switch 101T are shut down. To perform these operations, the user may input a shutdown command (refer to the description about FIG. 3) for the port 201K to the switch 101S and input a shutdown command for the port 201N to the switch 101U, for example.

As a result, the port shutdown setting 307 on the port 201K is changed to SHUTDOWN in the configuration table 221 of the switch 101S and the port state 503 on the port 201K is changed to DOWN in the port link state management table 223. The same applies to the port 201N of the switch 101U.

As a result, the switch 101Q detects a failure in the ring 103E because a ring health check frame cannot circulate around the ring 103E. Accordingly, the switch 101Q changes the state of the secondary port 201J to FORWARDING as illustrated in FIG. 16(3). Furthermore, the switch 101Q sends a flush control frame. These operations are the same as the processing of the master node described with FIG. 15 (Steps 1510 to 1514) in Embodiment 1. As a result, transmission of data frames via the communication path which does not include the switch 101T in the communication paths on the ring 103E can be continued after the switch 101T is cut off from the ring 103E.

Furthermore, one of the ring ports of the switch 101T is disabled. In the example of FIG. 16(3), out of the two ring ports 201L and 201M of the switch 101T, the port 201L on the side of the switch 101S is disabled. Specifically, the user may physically remove the network cable connecting the ports 201K and 201L and delete the information on the switch 101T from the configuration table 221 to complete this disabling.

Next, a stacked node 102E formed of the switches 101T and 101W is created by adding a new switch 101W (FIG. 16(4)). Specifically, the user may connect the switch 101W with the switch 101T and input commands to each of the switches to create configuration tables 221 of the switches 101T and 101W (refer to the description of FIG. 3). Then, the switches 101T and 101W each execute the operation flow of FIG. 14 to create a stacked node 102E.

Subsequently, the user connects the ring port 201O of the switch 101W with the ring port 201K of the switch 101S (FIG. 16(5)).

Subsequently, the shutdown of the ring ports connected with the node 102E of the switches 101S and 101U, which are adjacent to the created node 102E, is canceled (FIG. 16(6)). The user may input a NO SHUTDOWN command for the port 201K to the switch 101S (refer to the description of FIG. 3) and input a NO SHUTDOWN command for the port 201N to the switch 101U to perform the operations. As a result, ring health check frames can circulate around the ring 103E, so that the switch 101Q detects recovery of the ring 103E from the failure (Step 1510 in FIG. 15). At this phase, the ring ports 201O and 201M of the created node 102E and the ring ports 201K and 201N connected with them are in blocking states (Steps 1521 to 1524 in FIG. 15).

The switch 101Q that has detected the recovery of the ring 103E changes the secondary port 201J to a blocking state (FIG. 16 (7)). Further, the switch 101Q sends a flush control frame so that the ports 201K, 201M, 201N, and 201O are changed from the blocking states to forwarding states. As a result, the ring 103E turns to a normal state (Steps 1516 to 1520 in FIG. 15, Step 1525 to 1527 in FIG. 15).

FIG. 16 illustrates an example of creating a stacked node 102E by adding a new switch 101W to a switch 101T working as a part of a ring 103E; however, a ring 103E which does not include a switch 101T in the initial state may be reconfigured by increasing a stacked node 102E formed of switches 101T and 101W. Specifically, in the case where the switch 101S is connected with the switch 101U in the initial state, operations of shutting down the ring ports 201K and 201N of these switches, connecting a stacked node 102E between them, and canceling the shutdown lead to increasing the node 102E. These shutting down, cancelling the shutdown, and the processing before and after these operations are performed by the same procedure as illustrated in FIG. 16; detailed explanation is omitted.

Figure 17:
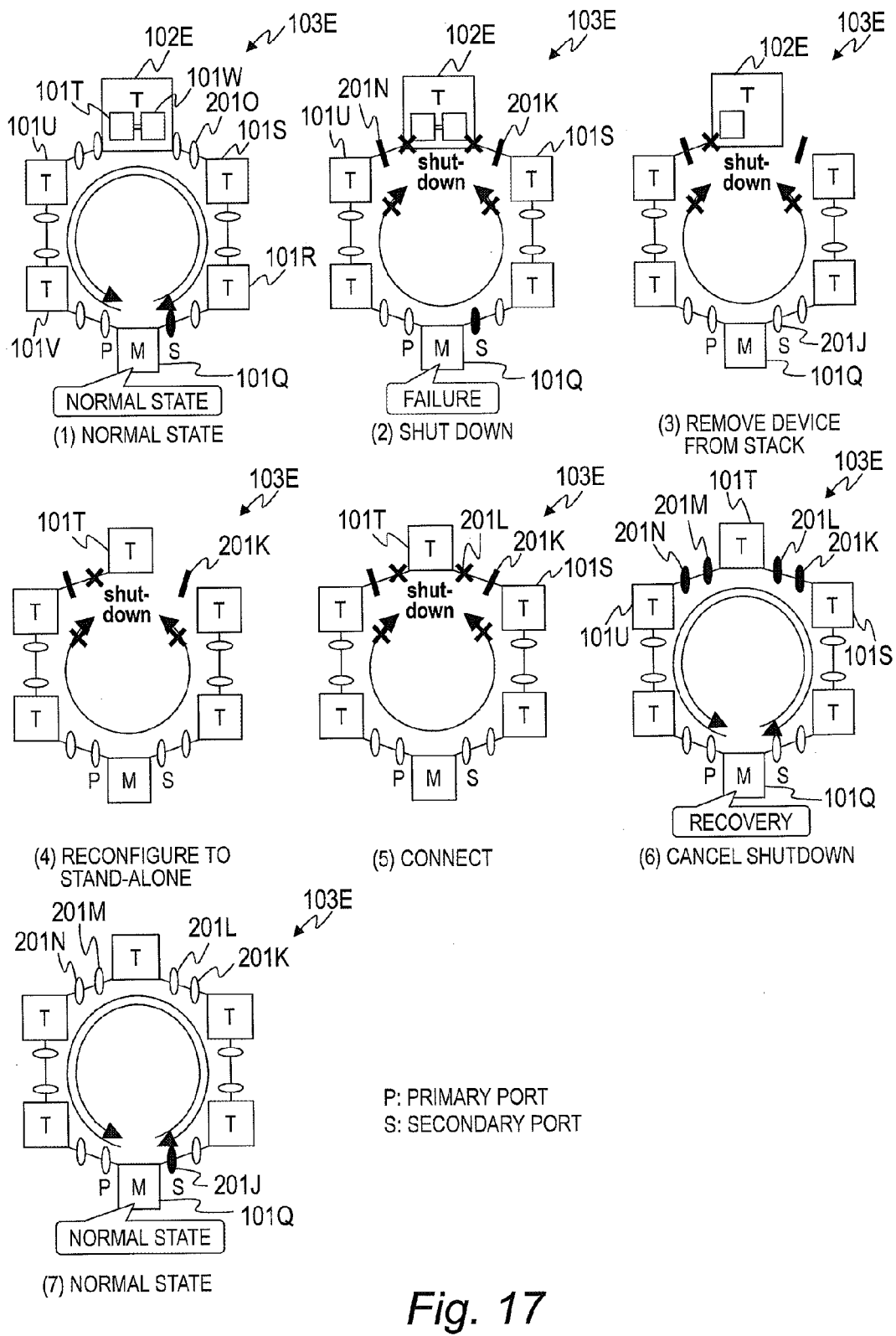
FIG. 17 is an explanatory diagram illustrating removing a switch from a transit node from the network system in Embodiment 2 of this invention.

FIG. 17 is an explanatory diagram illustrating removing a switch from a transit node from the network system in Embodiment 2 of this invention.

With reference to FIG. 17, described is a procedure to change a stacked transit node into a transit node including a stand-alone switch by removing one of the switches from the transit node included in a ring.

As illustrated in FIG. 17(1), the ring 103E before the removal is formed by annularly connecting switches 101Q to 101W; the switch 101Q is a master node, each of the switches 101R, 101S, 101U, and 101V is a transit node. The transit node 102E connected between the switches 101S and 101U is a stacked node formed of the switches 101T and 101W. The switches 101Q to 101W may be the same as the switches shown in FIG. 16. The ring 103E may be originally created as illustrated in FIG. 17(1) or created through the procedure illustrated in FIG. 16.

Using the above-described ring 103E, a procedure to change the transit node 102E to a node formed of only the switch 101T by removing the switch 101W is described. First, as illustrated in FIG. 17(2), in the switches 101S and 101U adjacent to the switch 101T to be removed, the ring ports 201K and 201N connected with the node 102E are shut down, which. These operations are performed in the same way as those in FIG. 16(2). As a result, the switch 101Q detects a failure in the ring 103E (Steps 1510 and 1511 in FIG. 15).

Subsequently, the switch 101Q changes the secondary port 201J into a forwarding state (FIG. 17(3)). Further, the switch 101Q sends a flush control frame (Steps 1512 to 1514 in FIG. 15). As a result, transmission of data frames can be continued using the communication path which does not include the switch 101E in the communication paths on the ring 103E even after the switch 101E is cut off from the ring 103E. Further, the ring port 201O of the switch 101W is disabled. These operations are performed in the same way as those in FIG. 16(3).

Next, the switch 101W is removed (FIG. 17(3), (4)). For example, the user may separate the switch 101W from the switch 101T and input commands to the switch 101T to create a configuration table for the switch 101T (refer to the description of FIG. 3). It should be noted that the switch 101T may execute the operation flow of FIG. 14 to cancel the stacked node 102E after the removal of the switch 101W. Specifically, identifying "Others" at Step 1401 and determining "All stack ports DOWN" at Step 1414 mean that the switch 101T is a MASTER in the stack state and a TRANSIT in the ring mode. Then, the user connects the ring port 201L of the switch 101T with the ring port 201K of the switch 101S (FIG. 17(5)).

Subsequently, the shutdown of the ring ports connected with the switch 101T of the switches 101S and 101U, which are adjacent to the created node 102T, is canceled (FIG. 17(6)). This processing is performed in the same way as the one in FIG. 16(6). The switch 101Q detects recovery of the ring 103E from a failure (Step 1510 in FIG. 15). At this phase, the ports 201K to 201N are in blocking states (Steps 1521 to 1524 in FIG. 15).

The switch 101Q that has detected the recovery of the ring 103E changes the secondary port 201J to a blocking state (FIG. 17(7)). Further, the switch 101Q sends a flush control frame so that the ports 201K to 201N are changed from the blocking states to forwarding states. As a result, the ring 103E turns to a normal state (Steps 1516 to 1520 in FIG. 15, Steps 1521 to 1527 in FIG. 15).

FIG. 17 illustrates an example of removing the switch 101W from the stacked node 102E and maintaining the switch 101T as a transit node; however, a ring 103E composed of five switches may be created by removing the whole node 102E and connecting the switch 101S with the switch 101U. This is accomplished by shutting down the port 201K of the switch 101T and the port 201N of the switch 101U, newly connecting the port 201K with the port 201N, and cancelling the shutdown. These shutting down, cancelling the shutdown, and the processing before and after these operations are performed by the same procedure as illustrated in FIG. 17; detailed explanation is omitted.

As described above, Embodiment 2 achieves addition of a switch to change a transit node of a ring to a stacked transit node or removal of a switch to change a stacked transit node to a transit node formed of a stand-alone switch while keeping the communications of data frames in the ring.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs for providing the functions. The information of programs, tables, and files to implement the functions may be stored in a storage device such as a memory, a hard disk drive, or an SSD (Solid State Drive), or a storage medium such as an IC card, or an SD card.

The ring protocol is not limited to the above-described protocol and may be a redundancy protocol for detecting a failure in a network annularly connecting multiple nodes like in FIG. 1 and switching paths upon detection of the failure, for example, EAPS (Ethernet Automatic Protection System, where Ethernet is a registered trademark).

The drawings shows control lines and information lines as considered necessary for explanations but do not show all control lines or information lines in the products. It may be considered that almost of all components are interconnected in actual cases.

What is claimed is:

1. A data transfer device system belonging to a ring network system,
   the data transfer device system comprising a plurality of data transfer devices,
   the plurality of data transfer devices including a first data transfer device and a second data transfer device connected with the first data transfer device,
   the first data transfer device having a first port connected with a third data transfer device which belongs to the network system and does not be included in the data transfer device system, and
   the second data transfer device having a second port connected with a fourth data transfer device which belongs to the network system and does not be included in the data transfer device system,
   wherein the first data transfer device controls whether to permit the first port and the second port to transfer data based on a state of the network system, an attribute of the first data transfer device in the data transfer device system, and an attribute of the data transfer device system in the network system
   wherein the state of the network system is either a failed state in which a failure occurs in the second data transfer device or any other part in the network system or a normal state in which no failure occurs,
   wherein the attribute of the data transfer device system in the network system is either a master node configured to monitor the network system for a failure or a transit node configured not to monitor the network system for a failure, and
   wherein the attribute of the first data transfer device in the data transfer device system is either a master device or a backup device, the master device being configured to control data transfer by the first data transfer device and the second data transfer device and to perform processing of the master node in a case where the data transfer device system is the master node, and the backup device being configured to be controlled by the second data transfer device of the master device and to newly become the master device when a failure occurs in the second data transfer device.

2. The data transfer device system according to claim 1, wherein the first data transfer device further has a third port and the second data transfer device further has a fourth port connected with the third port,
   wherein the first data transfer device holds configuration information including information indicating that the first port of the first data transfer device and the second port of the second data transfer device are each connected with a data transfer device adjacent to the data transfer device system in the network system and information indicating that the third port of the first data transfer device and the fourth port of the second data transfer device are connected with each other,
   wherein, when the second data transfer device is removed from the data transfer device system, the first data transfer device updates the configuration information by deleting the information indicating that the third port of the first data transfer device and the fourth port of the second data transfer device are connected with each other and altering the information to indicate that a port other than the first port of ports of the first data transfer device is connected with the data transfer device adjacent to the data transfer device system, and
   wherein, when the second data transfer device is added to the data transfer device system, the first data transfer device updates the configuration information by adding the information indicating that the third port of the first data transfer device and the fourth port of the second data transfer device are connected with each other and altering the information to indicate that the second port of the second data transfer device is connected with the data transfer device adjacent to the data transfer device system.

3. The data transfer device system according to claim 1, wherein, in a case where the attribute of the first data transfer device in the data transfer device system is the backup device and the attribute of the data transfer device system in the network system is the master node, upon detection of a failure in the second data transfer device, the first data transfer device changes the attribute of the first data transfer device in the data transfer device system to the master device and controls the first port to transfer user data.

4. The data transfer device system according to claim 3, wherein, upon detection of recovery of the network system from the failed state into the normal state, the first data transfer device controls one of the first port and the second port to transfer user data and controls the other not to transfer user data.

5. The data transfer device system according to claim 1, wherein, in a case where the attribute of the first data transfer device in the data transfer device system is the master device and the attribute of the data transfer device system in the network system is the master node, upon detection that the state of the network system is the failed state, the first data transfer device controls the first port and the second port to transfer user data.

6. The data transfer device system according to claim 5, wherein, upon detection of recovery of the network system from the failed state into the normal state, the first data transfer device controls one of the first port and the second port to transfer user data and controls the other not to transfer user data.

7. The data transfer device system according to claim 1, wherein, in a case where the attribute of the first data transfer device in the data transfer device system is the backup device and the attribute of the data transfer device system in the network system is the transit node, upon detection of a failure in the second data transfer device, the first data transfer device changes the attribute of the first data transfer device in the data transfer device system to the master device.

8. The data transfer device system according to claim 1, wherein the first data transfer device further has a third port,
wherein the second data transfer device further has a fourth port connected with the third port,
wherein the first data transfer device and the second data transfer device each send first control data to the other from the third port and the fourth port, respectively,
wherein the first data transfer device detects a failure in the second data transfer device based on whether the first control data from the second data transfer device is received, and
wherein, in a case where the attribute of the first data transfer device in the data transfer device system is the master device and the attribute of the data transfer device system in the network system is the master node, the first data transfer device sends second control data from the first port and the third port and determines the state of the network system based on whether the first data transfer device receives the second control data.

9. A network system comprising a plurality of annularly connected nodes each formed of one or more data transfer devices,
a first node of the plurality of nodes including a first data transfer device and a second data transfer device connected with the first data transfer device,
the first data transfer device having a first port connected with a second node of the plurality of nodes, and
the second data transfer device having a second port connected with a third node of the plurality of nodes,
wherein the first data transfer device controls whether to permit the first port and the second port to transfer data based on a state of the network system, an attribute of the first data transfer device in the first node, and an attribute of the first node in the network system,
wherein the state of the network system is either a failed state in which a failure occurs in the second data transfer device or any other part in the network system or a normal state in which no failure occurs,
wherein the attribute of the first node in the network system is either a master node configured to monitor the network system for a failure or a transit node configured not to monitor the network system for a failure, and
wherein the attribute of the first data transfer device in the first node is either a master device or a backup device, the master device being configured to control data transfer by the first data transfer device and the second data transfer device and to perform processing of the master node in a case where the first node is the master node, and the backup device being configured to be controlled by the second data transfer device of the master device and to newly become the master device when a failure occurs in the second data transfer device.

10. The network system according to claim 9,
wherein, in a case where the attribute of the first data transfer device in the first node is the backup device and the attribute of the first node in the network system is the master node, upon detection of a failure in the second data transfer device, the first data transfer device changes the attribute of the first data transfer device in the first node to the master device and controls the first port to transfer user data.

11. The network system according to claim 10,
wherein, in a case where the attribute of the first data transfer device in the first node is the master device and the attribute of the first node in the network system is the master node, upon detection that the state of the network system is the failed state, the first data transfer device controls the first port and the second port to transfer user data.

12. The network system according to claim 11,
wherein, upon detection of recovery of the network system from the failed state into the normal state, the first data transfer device controls one of the first port and the second port to transfer user data and controls the other not to transfer user data.

13. A method of changing a configuration of a network system,
the network system including a plurality of annularly connected nodes each formed of one or more data transfer devices,
each of the plurality of nodes having two ring ports each connected to an adjacent node in the network system,
the plurality of nodes including a master node configured to monitor the network system for a failure and a plurality of transit nodes configured not to monitor the network system for a failure, the plurality of nodes including a first node formed of only a first data transfer device of one of the one or more data transfer devices and configured as a transit node, a second node connected with one of the ring ports of the first data transfer device, and a third node connected with the other ring port of the first data transfer device, the method comprising:

a first step of shutting down, by each of the second node and the third node, the ring port connected with the first node;

a second step of controlling, by the master node, both of the two ring ports of the master node to transfer user data upon detection of a failure in the network system caused by the shutting down of the first step;

a third step of changing the first node into a node formed of the first data transfer device and a second data transfer device other than the data transfer devices included in the network system by configuring one of the first data transfer device and the second data transfer device as a master device for controlling data transfer by the first data transfer device and the second data transfer device and configuring the other as a backup device to be controlled by the master device and to become a new master device when a failure occurs in the master device, after one of the ring ports of the first data transfer device is disconnected from the second node and one of the ports of the first data transfer device is connected with the second data transfer device;

a fourth step of canceling, by each of the second node and the third node, the shutdown of the ring port connected with the first node, after the ring port of the second data transfer device is connected with the second node; and a fifth step of controlling, by the master node, one of the two ring ports of the master node not to transfer user data, upon detection of recovery of the network system from a failure caused by the cancelling of the shutdown in the fourth step.

14. The method of changing the configuration of the network system according to claim 13, further comprising:

a sixth step of shutting down, by each of the second node and the third node, the ring port connected with the first node, after the fifth step;

a seventh step of controlling, by the master node, both of the two ring ports of the master node to transfer user data, upon detection of a failure in the network system caused by the shutting down of the sixth step;

an eighth step of changing the first node into a node formed of only the first data transfer device, after one of the ring port of the second data transfer device is disconnected from the second node and the first data transfer device is disconnected from the second data transfer device;

a ninth step of canceling, by each of the second node and the third node, the shutdown of the ring port connected with the first node, after the ring port of the two ring port of the first node which is not connected with the third node is connected with the second node; and a tenth step of controlling, by the master node, one of the two ring port of the master node not to transfer user data, upon detection of recovery of the network system from a failure caused by the canceling the shutdown in the ninth step.

* * * * *